(12) United States Patent
Lin et al.

(10) Patent No.: US 12,114,350 B2
(45) Date of Patent: Oct. 8, 2024

(54) METHODS AND APPARATUS FOR SWITCHING OF PDCCH MONITORING CAPABILITY

(71) Applicant: Samsung Electronics Co., Ltd., Suwon-si (KR)

(72) Inventors: Qiongjie Lin, Sunnyvale, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 17/654,939

(22) Filed: Mar. 15, 2022

(65) Prior Publication Data

US 2022/0304046 A1 Sep. 22, 2022

Related U.S. Application Data

(60) Provisional application No. 63/308,340, filed on Feb. 9, 2022, provisional application No. 63/167,976, filed on Mar. 30, 2021, provisional application No. 63/164,136, filed on Mar. 22, 2021.

(51) Int. Cl.
*H04W 74/00* (2009.01)

(52) U.S. Cl.
CPC .................. *H04W 74/006* (2013.01)

(58) Field of Classification Search
CPC ... H04W 74/006; H04W 72/21; H04W 72/23; H04W 74/0833; H04W 72/0446; H04W 74/004; H04L 5/0053; H04L 5/0096
See application file for complete search history.

(56) References Cited

U.S. PATENT DOCUMENTS

2017/0251518 A1* 8/2017 Agiwal ............... H04W 76/28
2020/0396684 A1* 12/2020 Lin .................... H04W 52/0216
(Continued)

FOREIGN PATENT DOCUMENTS

WO 2020146499 A1 7/2020
WO 2020198356 A1 10/2020

OTHER PUBLICATIONS

3GPP, 3rd Generation Partnership Project;Technical Specification Group Radio Access Network; NR; NR and NG-RAN Overall Description, 3GPP TS 38.300 V17.0.0, Mar. 2022 (Year: 2022).*
(Continued)

*Primary Examiner* — Tejis Daya

(57) ABSTRACT

Methods and apparatuses for switching of physical downlink control channel (PDCCH) monitoring capabilities in a wireless communication system. A method for operating a user equipment includes receiving information to skip reception of a number of PDCCHs over a number of slots; determining an instruction to receive first PDCCHs in first slots from the number of slots based on a transmission of a physical uplink control channel (PUCCH) that provides a positive scheduling request (SR) in a first slot that is before the first slots, or skip the reception of the number of PDCCHs in the number of slots based on an absence of transmission of the PUCCH in the first slot; and based on the instruction, receiving the first PDCCHs in the first slots or skipping the reception of the first PDCCHs in the number of slots.

20 Claims, 16 Drawing Sheets

(56) References Cited

U.S. PATENT DOCUMENTS

2021/0007050 A1 1/2021 Lin
2021/0058304 A1 2/2021 Awoniyi-Oteri et al.

OTHER PUBLICATIONS

3GPP, Design of PDCCH-based Power Saving Signal and Channel, 3GPP TSG RAN WG1 #97, r1-1907345, May 17, 2019 (Year: 2019).*

3GPP, Report on [105bis#27][NR/Power Saving]—PDCCH skipping, 3GPP TSG-RAN WG2 Meeting #106, R2-1908072, May 17, 2019 (Year: 2019).*

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

"5G; NR; Medium Access Control (MAC) protocol specification (3GPP TS 38.321 version 16.3.0 Release 16)", ETSI TS 138 321 V16.3.0, Jan. 2021, 158 pages.

International Search Report and Written Opinion issued Jul. 13, 2022 regarding International Application No. PCT/KR2022/004010, 6 pages.

Qualcomm Incorporated, "DCI-based power saving adaptation during DRX Active Time", 3GPP TSG-RAN WG1 Meeting #104-e, R1-2101476, Jan. 2021, 4 pages.

CMCC, "Discussion on PDCCH monitoring reduction during DRX active time", 3GPP TSGRAN WG1 Meeting #104-e, R1-2101054, Jan. 2021, 3 pages.

Huawei et al., "Extension(s) to Rel-16 DCI-based power saving adaptation for an active BWP", 3GPP TSG-RAN WG1 Meeting #104-e, R1-2100218, Jan. 2021, 8 pages.

Extended European Search Report issued Aug. 21, 2024 regarding Application No. 22776068.3, 8 pages.

* cited by examiner

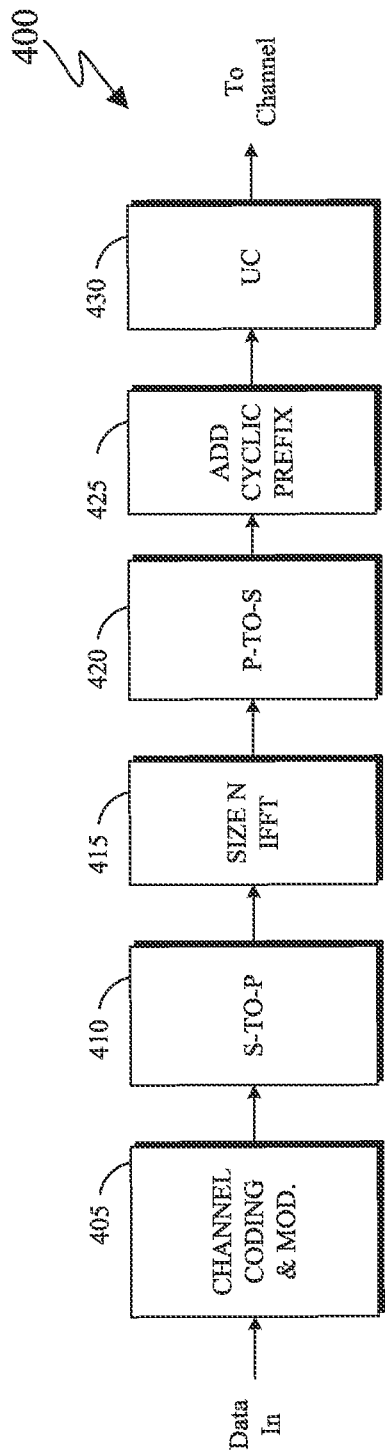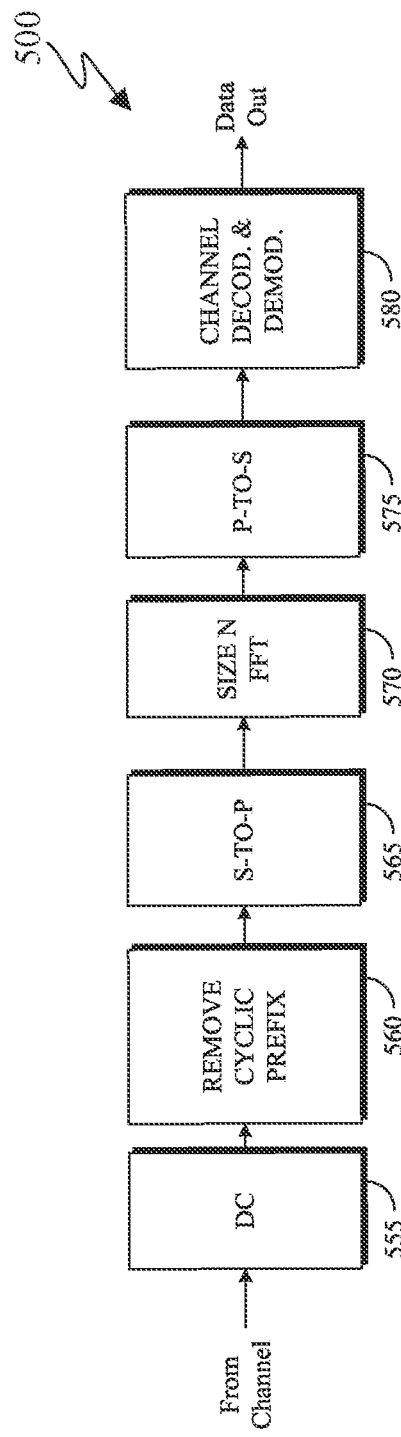

METHODS AND APPARATUS FOR SWITCHING OF PDCCH MONITORING CAPABILITY

CROSS-REFERENCE TO RELATED APPLICATION AND CLAIM OF PRIORITY

This application claims priority under 35 U.S.C. § 119(e) to U.S. Provisional Patent Application No. 63/164,136 filed on Mar. 22, 2021, U.S. Provisional Patent Application No. 63/167,976 filed on Mar. 30, 2021, and U.S. Provisional Patent Application No. 63/308,340 filed on Feb. 9, 2022. The above-identified provisional patent applications are hereby incorporated by reference in their entirety.

TECHNICAL FIELD

The present disclosure relates generally to wireless communication systems and, more specifically, the present disclosure relates to switching of physical downlink control channel monitoring capability.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to switching of physical downlink control channel monitoring capability.

In one embodiment, a user equipment (UE) is provided. The UE includes a transceiver configured to receive information to skip reception of a number of physical downlink control channels (PDCCHs) over a number of slots and a processor operably coupled to the transceiver. The processor is configured to instruct the transceiver to receive first PDCCHs in first slots from the number of slots when the UE transmits a physical uplink control channel (PUCCH) that provides a positive scheduling request (SR) in a first slot that is before the first slots, and instruct the transceiver to skip the reception of the number of PDCCHs in the number of slots when the UE does not transmit the PUCCH in the first slot. The transceiver is further configured to, based on the instruction by the processor, receive the first PDCCHs in the first slots or skip the reception of the number of PDCCHs in the number of slots.

In another embodiment, a base station (BS) is provided. The BS includes a transceiver configured to transmit information to skip transmission of a number of PDCCHs over a number of slots and a processor operably coupled to the transceiver. The processor is configured to instruct the transceiver to transmit first PDCCHs in first slots from the number of slots when the BS receives a PUCCH that provides a positive SR in a first slot that is before the first slots, and instruct the transceiver to skip the transmission of the number of PDCCHs in the number of slots when the BS does not receive the PUCCH in the first slot. The transceiver is further configured to, based on the instruction by the processor, transmit the first PDCCHs in the first slots or skip the transmission of the number of PDCCHs in the number of slots.

In yet another embodiment, a method is provided. The method includes receiving information to skip reception of a number of PDCCHs over a number of slots; determining an instruction to receive first PDCCHs in first slots from the number of slots based on a transmission of a PUCCH that provides a positive SR in a first slot that is before the first slots, or skip the reception of the number of PDCCHs in the number of slots based on an absence of transmission of the PUCCH in the first slot; and based on the instruction, receiving the first PDCCHs in the first slots or skipping the reception of the first PDCCHs in the number of slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of the present disclosure;

DETAILED DESCRIPTION

Figure 1:
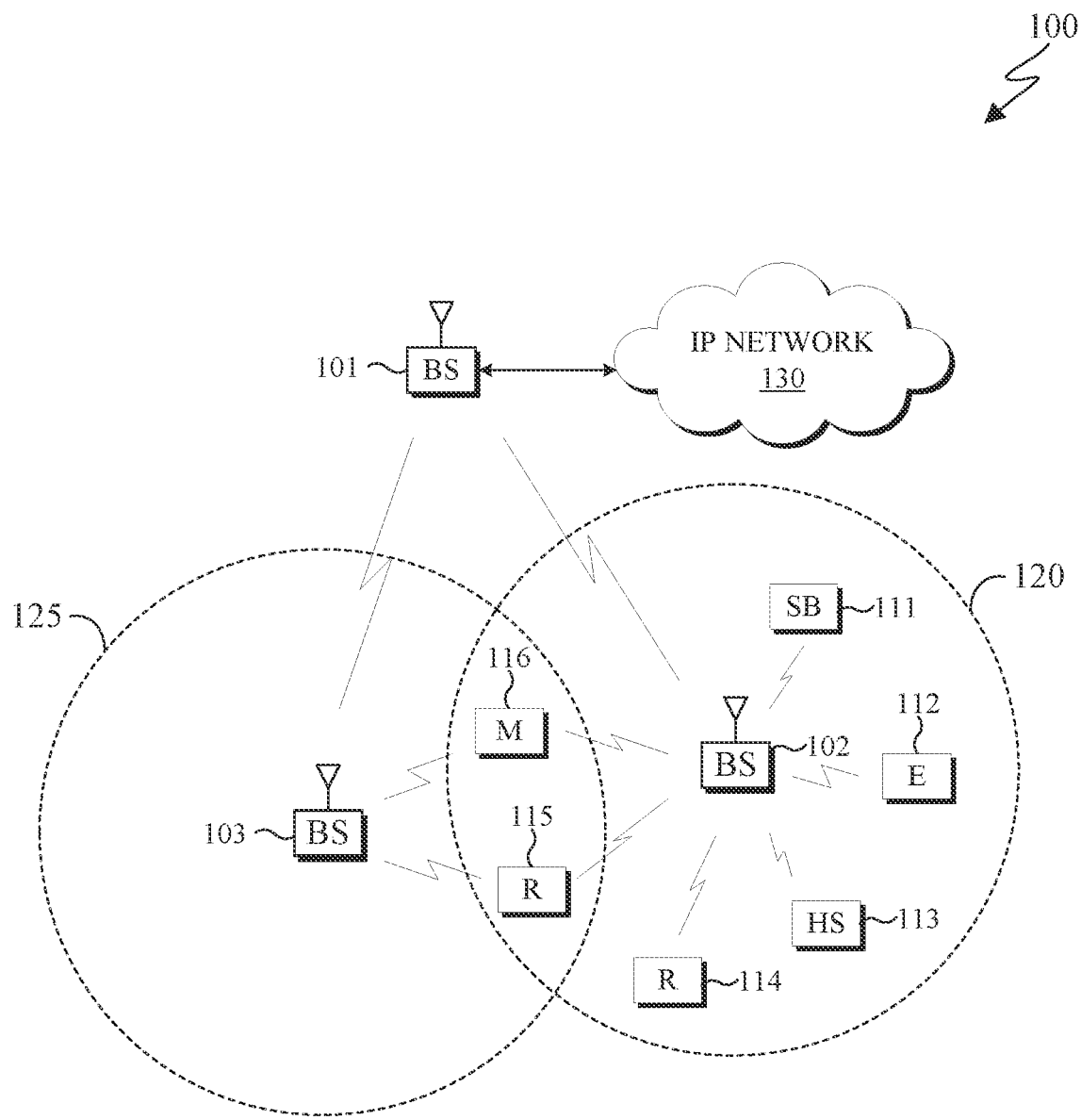
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and channel coding" ("REF2"); 3GPP TS 38.213 v16.4.0, "NR; Physical layer procedures for control" ("REF3"); 3GPP TS 38.214 v16.4.0, "NR; Physical layer procedures for data" ("REF4"); 3GPP TS 38.331 v16.3.1, "NR; Radio Resource Control (RRC) protocol specification" ("REF5"); and 3GPP TS 38.321 v16.3.0, "NR; Medium Access Control (MAC).protocol specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
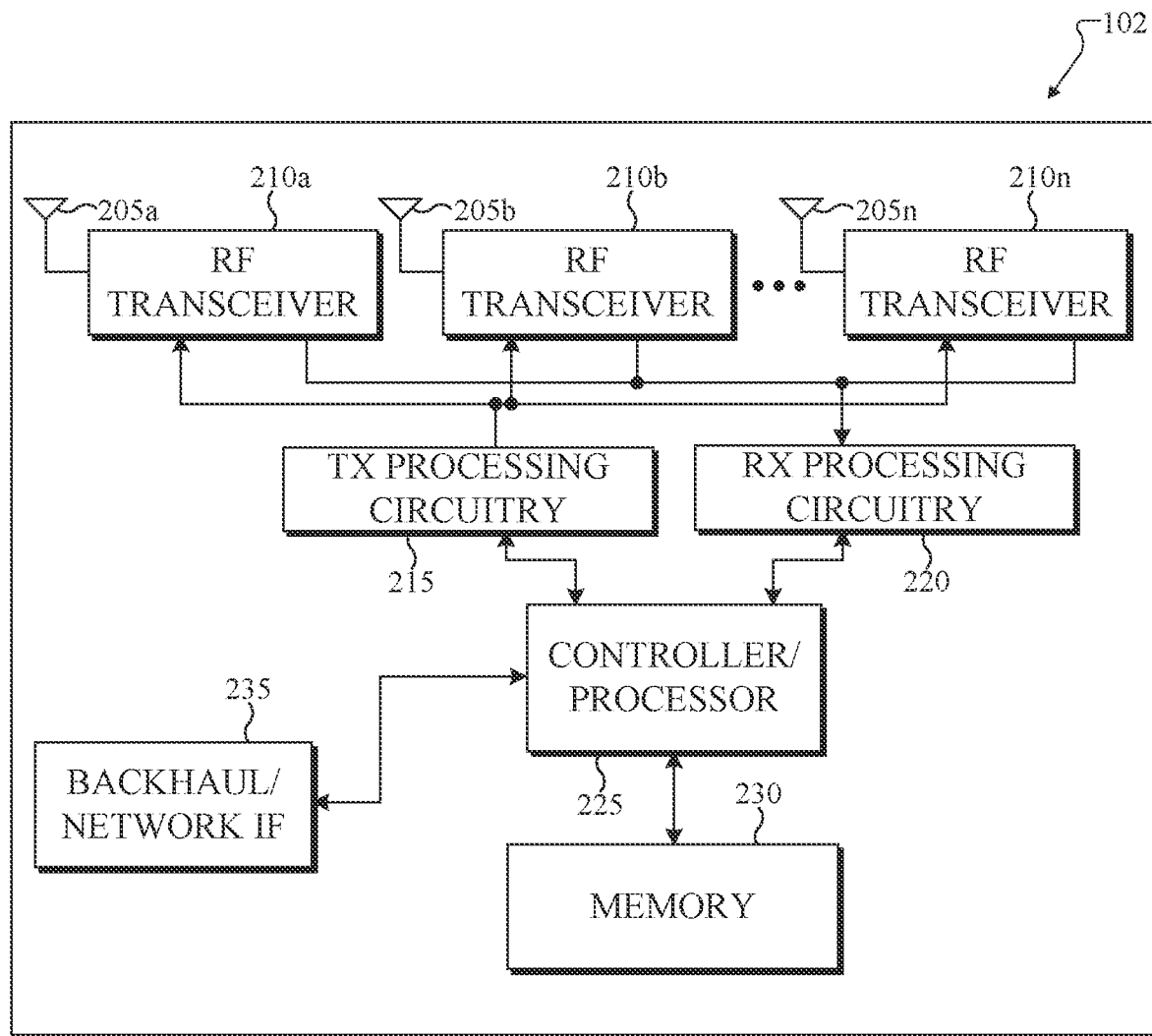
FIG. 2 illustrates an example BS according to embodiments of the present disclosure.
Figure 3:
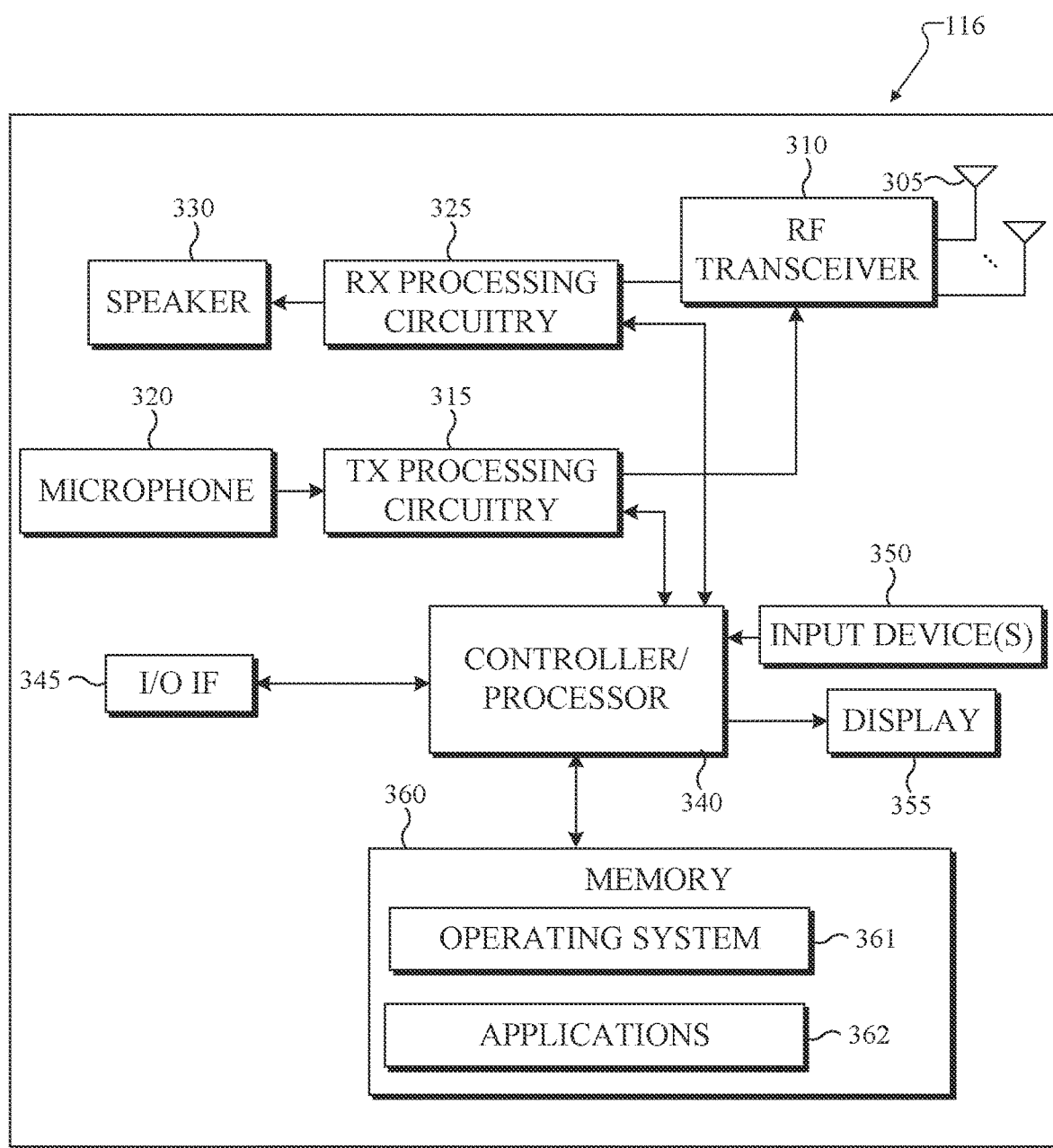
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for switching of physical downlink control channel (PDCCH) monitoring capability. In certain embodiments, and one or more of the BSs 101-103 includes circuitry, programing, or a combination thereof for switching of PDCCH monitoring capability.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support switching of PDCCH monitoring capability. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BS s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support switching of PDCCH monitoring capability as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure take into consideration that NR Rel-15 supports slot-based PDCCH monitoring with a maximum number of PDCCH candidates for decoding, that are also referred to as blind decodes (BD) for brevity, and a maximum number of non-overlapping control channel elements (CCEs) for channel estimation defined per slot for subcarrier spacing (SCS) of 15 kHz, 30 kHz, 60 kHz, and 120 kHz in Table 10.1-2 and Table 10.1-3 of TS 38.213 [REF-3]. The term PDCCH monitoring is used for brevity for the UE operations of PDCCH receptions and of decoding corresponding DCI formats in the PDCCH receptions.

Additionally, NR Rel-16 supports span-based PDCCH monitoring where the maximum numbers of PDCCH BDs and CCE limits are defined in Table 10.1-2A and Table 10.1-3A of TS 38.213 [REF-3] for different UE capabilities. A span duration is defined as a number of consecutive symbols in a slot within which a UE can monitor PDCCH and is denoted as Y. A number of symbols between first symbols of two consecutive spans is denoted as X and can be referred to for brevity as span gap. Three types of PDCCH monitoring capabilities with combination (X, Y) are supported. The span gap, X, can be 2 or 4 or 7 symbols, while the span duration, Y, is 2 or 3 symbols for SCS configuration $\mu=0, 1$, where the SCS is $2^\mu$ 15 kHz. For SCS of 60 kHz or larger, a slot duration is small enough so that span-based PDCCH monitoring does not need to be defined.

NR operation on a carrier with frequency between 52.6 GHz and 71 GHz requires an SCS of 120 kHz or larger to overcome phase noise and use a same FFT size as for operation with a lower carrier frequency. Therefore, new maximum numbers for PDCCH BDs and non-overlapping CCEs for higher SCS, such as 480 kHz and 960 kHz need to be defined. The transmission time interval (TTI) in terms of a span duration or a slot duration decreases linearly as the SCS increases. For a same UE PDCCH monitoring capability as for slot-based or span-based PDCCH monitoring with a maximum SCS of 120 kHz, the PDCCH monitoring overhead within a TTI would materially increase due to the short TTI duration for a high SCS. The larger PDCCH monitoring burden within a shorter TTI can also be challenging for a UE to implement. For example, a UE is not typically able to process a same maximum number of PDCCH BDs/non-overlapping CCEs per slot for SCS of 480 kHz as for SCS of 30 kHz, due to the shorter slot duration for SCS of 480 kHz. Multi-slot span based PDCCH monitoring can be considered to reduce the large PDCCH monitoring burden within a short TTI at high SCS by increasing a TTI of a slot to a TTI of more than one slots. A PDCCH monitoring capability in terms of maximum numbers of PDCCH BDs/non-overlapping CCEs at high SCS can be determined for a PDCCH monitoring period of multiple consecutive slots.

When a UE (such as the UE 116) is configured for operation with carrier aggregation (CA), including in case of dual connectivity (DC), the UE needs to monitor PDCCH for scheduling on multiple cells and a UE capability for a maximum numbers of PDCCH BD/non-overlapping CCEs may not scale linearly with a number of scheduled cells relative to a maximum numbers of PDCCH BDs/non-overlapping CCEs for a single scheduled cell. For operation with a small slot duration per scheduling cell, such as for SCS of 480 kHz or 960 kHz, the maximum numbers of PDCCH BDs/non-overlapping CCEs can be defined per multiple slots while, similar to 60 kHz or 120 kHz in NR Rel-16, they do not need to be defined per span smaller than a slot.

A UE supporting certain applications, such as multicast and broadcast services (MBS) or extended reality (XR) services, may be configured to support hybrid traffic types for different services. For example, a UE may support both mobile broadband (MBB) unicast traffic and multicast traffic. For example, a UE may support both MBB unicast traffic and XR traffic. For example, a UE may support multiple types of unicast traffic, or of multicast traffic, having different latency or reliability requirements.

In order to support traffic for various services, a UE can be configured to support more than one PDCCH monitoring capabilities, where each PDCCH monitoring capability can be used for PDCCH scheduling associated with a specific traffic type. PDCCH monitoring can be slot-based or span-based depending on latency requirements of corresponding traffic for scheduled physical downlink shared channel (PDSCH) receptions or physical uplink shared channel (PUSCH) transmissions. For example, there may not be any data associated with latency tolerant traffic for a UE in a buffer of a serving gNB and then the gNB can configure the UE for only span-based PDCCH monitoring. In this example, the gNB can also configure the UE also for slot-based PDCCH monitoring when corresponding data arrives at the buffer or when the UE transmits a physical uplink control channel (PUCCH) with a scheduling request (SR) requesting scheduling for PUSCH transmission with latency tolerant traffic. For example, when a UE is configured by a serving gNB to receive data associated with latency sensitive traffic using SPS PDSCH or to transmit a configured grant PUSCH (CG-PUSCH), the gNB may not configure the UE for span-based PDCCH monitoring until there are SPS PDSCH transmissions to the UE or CG-PUSCH receptions from the UE and scheduling of retransmissions by DCI formats provided by PDCCH receptions are needed.

Accordingly, embodiments of the present disclosure take into consideration that there is a need to support cell classification for partitioning limits per scheduled cell of PDCCH BDs/non-overlapping CCEs considering multi-slot based PDCCH monitoring and one or more other monitoring capabilities when a UE is configured with CA operation or NR-DC operation.

Embodiments of the present disclosure also take into consideration that there is a need to support fast adaptation of a PDCCH monitoring capability for a UE on a scheduling cell based on an indicator included in a DCI format.

Embodiments of the present disclosure further take into consideration that there is a need to support search space set classification for partitioning of limits per scheduled cell of PDCCH BDs/non-overlapping CCEs according to multiple PDCCH monitoring capabilities that can be supported simultaneously within an active downlink (DL) bandwidth part (BWP).

Accordingly, embodiments of the present disclosure relate to a pre-(5G) or 5G communication system to be provided for supporting higher data rates Beyond 4G communication system such as LTE. The disclosure relates to cell classification for partitioning of BDs/CCEs limit considering multi-slot based PDCCH monitoring and one or more other PDCCH monitoring capabilities when UE is configured with CA operation or NR-DC operation (such as described in FIG. 6). The disclosure also relates to dynamic adaptation of PDCCH monitoring capability for a serving cell based on an indicator included in a DCI format (such as described in FIGS. 7 and 8). The disclosure further relates to search space set classification for partitioning of BD/CCE limit according to multiple PDCCH monitoring capabilities supported simultaneously within an active DL BWP (such as described in FIGS. 9 and 10). Additionally, this disclosure relates to PDCCH skipping related to physical random access channel (PRACH) transmissions (such as described in FIG. 11).

Several applications for communications systems involve multicast or broadcast services (MBS) including mission critical, vehicle to everything (V2X) applications, multicast delivery, internet protocol television (IPTV), software delivery over wireless, group communications, and internet of things (IoT) applications. To support receptions of multicast PDSCHs, a UE (such as the UE 116) can be configured to monitor PDCCH, for example according to common search space (CSS) sets, for detection of DCI formats with cyclic redundancy check (CRC) bits scrambled by one or more radio network temporary identifiers (RNTIs) associated with MBS traffic, such as G-RNTIs, to schedule a respective PDSCHs for MBS. The UE can be configured multiple CSS sets that are associated with a same MBS traffic type or with different MBS traffic types that can be differentiated based on a corresponding DCI format size, or based on an indicator in a DCI format, or based on different G-RNTIs.

Although a DCI format that schedules a PDSCH with multicast traffic can be received in a PDCCH that the UE monitors according to a CSS, at least some of the contents of the DCI format and the configuration of a CSS set for PDCCH monitoring can be provided to a UE by UE-dedicated higher layer signaling. The term 'PDCCH monitoring' refers to reception of PDCCHs and decoding of corresponding DCI formats. Further, a unicast traffic that is for example provided by a PDSCH that is scheduled by a DCI format with CRC bits scrambled by a cell-RNTI (C-RNTI), can have higher priority than multicast traffic, it is beneficial to allow overbooking for PDCCHs that schedule multicast traffic in order to provide flexibility to a network to schedule multiple UEs without having to fine tune the configuration of search space sets for all multiple UEs. For brevity, a DCI format scheduling an MBS PDSCH reception is referred as DCI format 1_M.

The term PDCCH overbooking refers to the event that a UE is configured to monitor PDCCH during a time period, such as a slot or a span, and a number of PDCCH candidates or a number of non-overlapped CCEs to perform channel estimation, as defined in REF3, for a scheduled cell is larger than a maximum corresponding number for the scheduled cell over the time unit. The UE then needs to apply a procedure to determine search space sets for dropping PDCCH monitoring as described in REF3, wherein it is assumed that CSS sets are never dropped, UE-specific search space sets (USS sets) may be dropped, and the procedure needs to apply only for a primary cell.

A communication system can also support small data transmission (SDT) from a UE in RRC_IDLE/INACTIVE state when the UE successfully completes a random access (RA) procedure. After successful completion of the RA procedure, the UE can remain in idle/inactive state and be configured to monitor PDCCH for detection of a DCI format with CRC scrambled by C-RNTI to schedule a PDSCH reception or a PUSCH transmission. The UE can monitor PDCCH for a DCI format scheduling SDT either according to CSS sets or according to USS sets on a primary cell and a PDCCH overbooking event can occur.

A UE (such as the UE 116) in RRC_IDLE/INACTIVE state can be configured for both SDT and for MBS communication on a serving cell. A UE procedure would then need to be defined for an allocation of search space sets when an overbooking event occurs. Also, as a UE implementation is currently specified to handle up to X=4 sizes of DCI formats, wherein up to Y=3 sizes are associated with DCI formats with CRC bits scrambled by C-RNTI, a size alignment procedure for DCI formats scheduling SDT and MBS traffic needs to be defined when sizes of DCI formats that a UE monitors in RRC_IDLE/INACTIVE state exceed a predetermined number of sizes for DCI formats.

Accordingly, embodiments of the present disclosure take into consideration that there is a need to define an overbooking (search space set dropping) procedure for a UE in an RRC_INACTIVE state or RRC_IDLE state that is configured for SDT and for MBS communications.

Embodiments of the present disclosure also take into consideration that there is a to determine a DCI format size alignment procedure for a UE in an RRC_INACTIVE or RRC_IDLE state that is configured to monitor PDCCH for detection of DCI formats scheduling SDT and MBS.

Embodiments of the present disclosure further take into consideration that there is a need to determine a number of sizes for DCI formats with CRC bits with CRC scrambled by C-RNTI for a UE depending on whether the UE is in RRC INACTIVE/IDLE state or in SSC_CONNECTED state.

Accordingly, this disclosure relates to defining an overbooking procedure for a UE in RRC_IDLE/INACTIVE state that is configured for SDT and for MBS (such as described in FIGS. 12-16). The disclosure also relates to defining a procedure for maintaining a predetermined number of DCI format sizes for a UE in RRC_IDLE/INACTIVE state that is configured for SDT and for MBS (such as described in FIG. 17).

Embodiments of the present disclosure describe cell classification for partitioning of a limit per scheduled cell of PDCCH BDs/non-overlapping CCEs. This is described in the following examples and embodiments, such as those of FIG. 6. That is, embodiments of the disclosure considers a cell classification for partitioning of a limit per scheduled cell of PDCCH BDs/non-overlapping CCEs for multi-slot based PDCCH monitoring and one or more other PDCCH monitoring capabilities when a UE is configured with CA operation or NR-DC operation.

Figure 6:
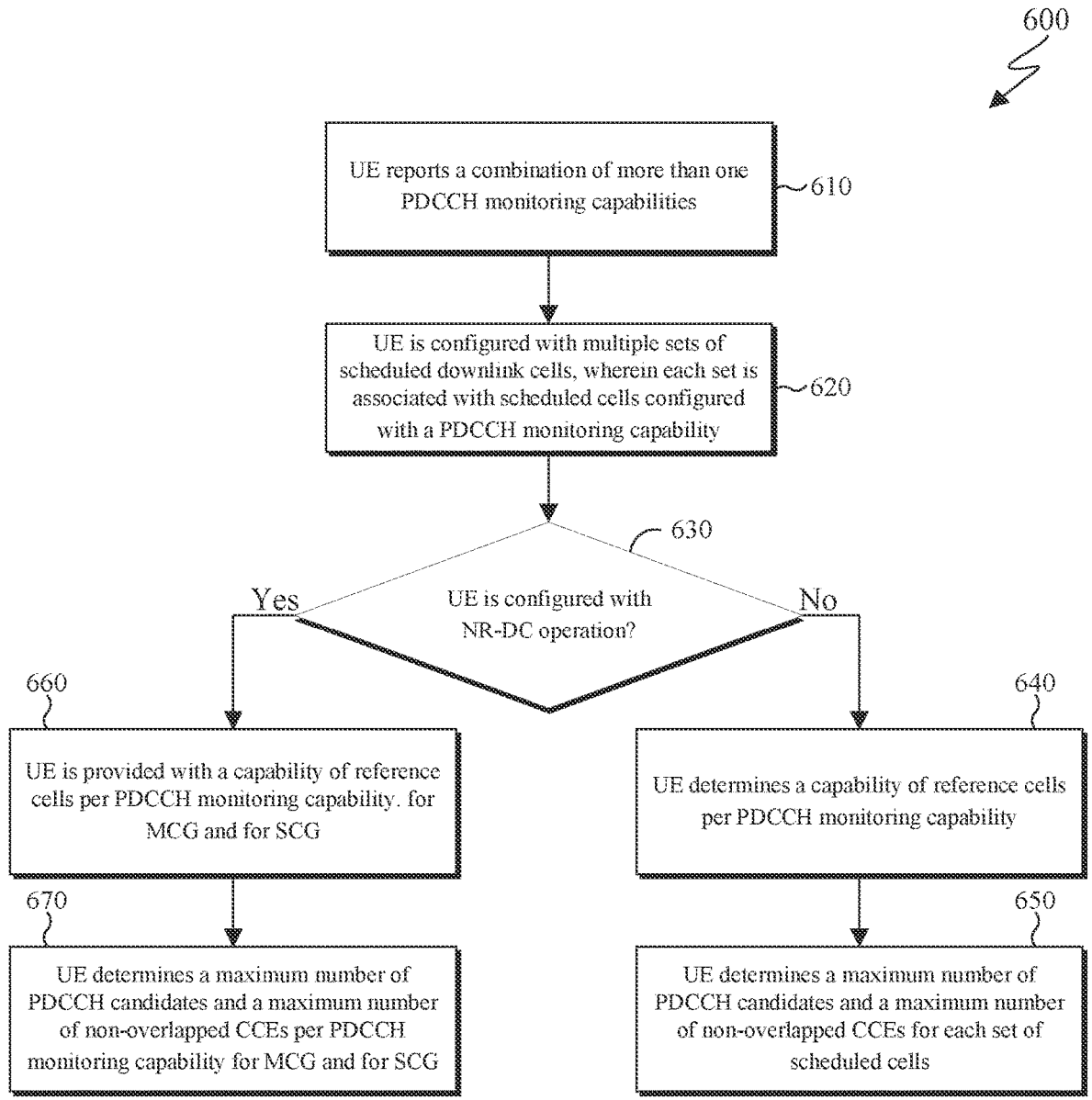
FIG. 6 illustrates an example method for classifying a scheduled cell for partitioning a limit of PDCCH blind decodes (BDs)/non-overlapping control channel elements (CCEs) for multiple PDCCH monitoring capabilities according to embodiments of the present disclosure.

FIG. 6 illustrates an example method 600 for classifying a scheduled cell for partitioning a limit of PDCCH BDs/non-overlapping CCEs for multiple PDCCH monitoring capabilities according to embodiments of the present disclosure. The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

In certain embodiments, a UE (such as the UE 116) can report a combination of one or more PDCCH monitoring capabilities that includes at least a multi-slot based PDCCH monitoring capability. The UE can monitor PDCCHs on an active DL BWP of a serving cell for a maximum number of $M_{PDCCH}^{max,N,\mu}$ PDCCH candidates and a maximum number of $c_{PDCCH}^{max,N,\mu}$ non-overlapped CCEs for PDCCH monitoring over N>1 consecutive slots. For example, the UE can be configured to monitor PDCCHs in any slot within the N>1 slots. For another example, the UE can be configured to monitor PDCCHs in the first Y slots within the N>1 slots, wherein 1<=Y<=N. A UE can determine a starting location for a group of N>1 consecutive slots based on a search space set configuration. Alternatively, a first group of N>1 consecutive slots starts from a slot with index zero, or from a first slot where the UE starts a drx-onDurationTimes timer associated with a discontinuous reception (DRX) cycle. The span duration Y can either be fixed (for example to 1 slot) or be part of the multi-slot based PDCCH monitoring capability and is reported by the UE to a serving gNB. The UE can be configured to monitor PDCCH for a scheduled cell according to a multi-slot based PDCCH monitoring capability.

In addition to a multi-slot based PDCCH monitoring capability, the combination of one or more PDCCH monitoring capabilities reported by a UE can include any of the following. For example, the UE can include a PDCCH monitoring capability per slot, wherein the UE monitors PDCCH on serving cells for a maximum number of PDCCH candidates and non-overlapping CCEs that are defined per slot for a SCS configuration pt. For another example, the UE can include a PDCCH monitoring capability per span, wherein the UE monitors PDCCH according to one or more of the combinations (X, Y) for a SCS configuration pt.

The method 600, as illustrated in FIG. 6 describes an example procedure for a UE to classify a scheduled cell for partitioning a limit of PDCCH BDs/non-overlapping CCEs for multiple PDCCH monitoring capabilities when the UE is configured with CA operation or NR-DC operation according to embodiments of the present disclosure.

In step 610, a UE (such as the UE 116) reports a combination of more than one PDCCH monitoring capabilities, including at least a multi-slot based PDCCH monitoring capability.

In step 620, the UE is configured with multiple sets of scheduled downlink cells. Each set of scheduled downlink cells is associated with one or more scheduling cells that are configured with a PDCCH monitoring capability from the combination of more than one PDCCH monitoring capabilities.

In step 630, the UE determines whether it is configured with NR-DC operation. When the UE is not configured with NR-DC operation (as determined in step 630), the UE in step 640 determines a capability to monitor a maximum number of PDCCH candidates and non-overlapped CCEs that corresponds to $N_{cells}^{cap-X}$ cells for a set of scheduled downlink cells from the multiple sets of scheduled downlink cells that is configured with PDCCH monitoring capability, X. In step 650, the UE then determines a maximum number of PDCCH candidates and a maximum number of non-overlapped CCEs for each set of scheduled downlink cells based on corresponding PDCCH monitoring capability, the number of scheduled cells in the set of scheduled cells, and $N_{cells}^{cap-X}$.

Alternatively, when the UE is configured with NR-DC operation with a MCG and a SCG (as determined in step 630), the UE in step 660 is provided a first PDCCH monitoring capability to indicate a reference number of $N_{cells,X}^{MCG}$ cells for PDCCH monitoring corresponding to a set of scheduled cells that is configured with PDCCH monitoring capability X for the MCG and another PDCCH monitoring capability to indicate a reference number of $N_{cells,X}^{SCG}$ cells for PDCCH monitoring corresponding to a set of scheduled cells that is configured with PDCCH monitoring capability X for the SCG. In step 670, the UE then determines a maximum number of PDCCH candidates and a maximum number of non-overlapped CCEs for MCG and for SCG, respectively, for each set of scheduled cell based on corresponding PDCCH monitoring capability.

In certain embodiments, a UE (such as the UE 116) can receive a PDCCH for scheduling a PDSCH or a PUSCH from two TRPs for multi-slot based PDCCH monitoring. The UE can be configured with $N_{cells,0}^{DL}+N_{cells,1}^{DL}$ downlink serving cells. For a first set of $N_{cells,0}^{DL}$ serving cells the UE is either not provided coresetPoolIndex or is provided coresetPoolIndex with a single value for all CORESETs on all DL BWPs of each scheduling cell from the first set of $N_{cells,0}^{DL}$ serving cells. For a second set of $N_{cells,1}^{DL}$ serving cells the UE is not provided coresetPoolIndex or is provided coresetPoolIndex with value 0 for first CORESETs and is provided coresetPoolIndex with value 1 for second CORESETs on any DL BWP of each scheduling cell from the second set of $N_{cells,1}^{DL}$ serving cells. For the purpose of PDCCH monitoring, the UE can determine a number of serving cells as $N_{cells,0}^{DL}+R \cdot N_{cells,1}^{DL}$, where R is a value reported by the UE as a capability.

In a first case of cell classification for partitioning a limit of PDCCH BDs/non-overlapped CCEs, a UE (such as the UE 116) is configured only with multi-slot based PDCCH monitoring over N>1 consecutive slots. The UE can report, for example in UE-NR-Capability, a CA capability for a number of serving cells that is larger than $N_{cells,min}^{cap-mslot}$ with multi-slot based PDCCH monitoring. The CA capability can be provided by pdcch-BlindDetectionCA-mslot for scaling a PDCCH monitoring capability if the number of serving cells configured to the UE for multi-slot based PDCCH monitoring is larger than the reported capability. The UE can configure a number of scheduled cells larger than $N_{cells,min}^{cap-mslot}$ for PDCCH monitoring per N>1 consecutive slots. $N_{cells,min}^{cap-mslot}$ can be predetermined such as, for example $N_{cells,min}^{cap-mslot}=1$ or $N_{cells,min}^{cap-mslot}=2$.

When a UE is not configured for NR-DC operation and the UE is configured for multi-slot PDCCH monitoring for all downlink cells where the UE monitors PDCCH, the UE determines a capability to monitor a maximum number of PDCCH candidates and a maximum number of non-overlapped CCEs per N>1 consecutive slots that corresponds to $N_{cells}^{cap-mslot}$ downlink cells. In this example, $N_{cells}^{cap-mslot}$ is $N_{cells,0}^{DL}+R \cdot N_{cells,1}^{DL}$ if the UE does not provide pdcch-BlindDetectionCA-mslot where $N_{cells,0}^{DL}+N_{cells,1}^{DL}$ is the number of configured downlink serving cells, otherwise, $N_{cells,min}^{cap-mslot}$ is the value of pdcch-BlindDetectionCA-mslot.

When a UE (such as the UE 116) is configured for (i) NR-DC operation and (ii) multi-slot PDCCH monitoring for all downlink cells where the UE monitors PDCCH, the UE determines a capability to monitor a maximum number of PDCCH candidates and a maximum number of non-overlapped CCEs per N>1 consecutive slots that corresponds to $N_{cells}^{mslot}=N_{cells,mslot}^{MCG}$ downlink cells for the MCG ($N_{cells,mslot}^{MCG}$ is provided by pdcch-BlindDetection-mslot for the MCG), and determines a capability to monitor a maximum number of non-overlapped CCEs per N>1 consecutive slots that corresponds to $N_{cells}^{mslot}=N_{cells,mslot}^{MCG}$ downlink cells for the SCG ($N_{cells,mslot}^{SCG}$ is provided by pdcch-BlindDetection-mslot for the SCG). When a UE is configured for a CA operation over more than $N_{cells}^{mslot}$ cells, or for a cell group when the UE is configured for NR-DC operation, the UE does not expect to monitor per N>1 consecutive slots a number of PDCCH candidates or a number of non-overlapped CCEs that is larger than a maximum number derived from $N_{cells}^{mslot}$.

When a UE is configured for NR-DC operation with a total of $N_{NR-DC}^{DL,cell}$ downlink cells on both the MCG and the SCG and the UE is configured for multi-slot PDCCH monitoring for all downlink cells where the UE monitors PDCCH, the UE expects to be provided pdcch-BlindDetection-mslot for the MCG and pdcch-BlindDetection-mslot for the SCG with values that satisfy one of the following two conditions. The first condition specifies that pdcch-BlindDetection-mslot for MCG+pdcch-BlindDetection-mslot for SCG<=pdcch-BlindDetectionCA-mslot, if the UE reports pdcch-BlindDetectionCA-mslot. The second condition specifies that pdcch-BlindDetection-mslot for MCG+pdcch-BlindDetection-mslot<=$N_{NR-DC}^{DL,cell}$ if the UE does not report pdcch-BlindDetectionCA-mslot.

When a UE is configured for (i) NR-DC operation with a total of $N_{NR-DC}^{DL,cell}$ downlink cells on both the MCG and the SCG and (ii) multi-slot PDCCH monitoring for all downlink cells where the UE monitors PDCCH, the UE may indicate, through pdcch-BlindDetectionMCG-UE and pdcch-BlindDetectionSCG-UE, respectively maximum values for pdcch-BlindDetection-mslot for the MCG and pdcch-BlindDetection-mslot for the SCG.

If the UE reports pdcch-BlindDetectionCA-mslot, then (i) the value range of pdcch-BlindDetectionMCG-UE-mslot or of pdcch-BlindDetectionSCG-UE-mslot is [1, . . . , pdcch-BlindDetectionCA-mslot-1] and (ii) Equation (1) is true. Otherwise, if $N_{NR-DC,max,mslot}^{DL,cell}$ is a maximum total number of downlink cells for which the UE is (i) configured with multi-slot based PDCCH monitoring and (ii) configured on both the MCG and the SCG for NR-DC, then (i) the value range of pdcch-BlindDetectionMCG-UE-mslot or of pdcch-BlindDetectionSCG-UE-mslot is 1 or [1, . . . , $N_{cells,min}^{cap-mslot}$-1], or 1, and (ii) Equation (2) is true.

pdcch-BlindDetectionMCG-UE-mslot+pdcch-BlindDetectionSCG-UE-mslot>=pdcch-BlindDetectionCA-mslot  (1)

pdcch-BlindDetectionMCG-UE-mslot+pdcch-BlindDetectionSCG-UE-mslot>=$N_{NR-DC,max,mslot}^{DL,cell}$  (2)

In a second case of cell classification for partitioning of a limit of PDCCH BDs/non-overlapped CCEs, the UE is configured with multi-slot based PDCCH monitoring and slot-based PDCCH monitoring. The UE can report, for example in UE-NR-Capability, a CA capability for a number of downlink cells that is larger than $N_{cells,min}^{cap-mslot}$ downlink cells with multi-slot based PDCCH monitoring or for a number of downlink cells that is larger than $N_{cells,min}^{cap-mslot}$ downlink cells with slot based PDCCH monitoring. The CA capability can be included in an indication for a maximum number of PDCCH candidates and a maximum number of non-overlapped CCEs that the UE can monitor for downlink cells with multi-slot based PDCCH monitoring or for downlink cells with slot based PDCCH monitoring when the UE is configured for CA operation over more than $N_{cells,min}^{cap-mslot}+N_{cells,min}^{cap-slot}$ downlink cells with at least $N_{cells,min}^{cap-mslot}$ downlink cells with multi-slot based PDCCH monitoring and at least $N_{cells,min}^{cap-slot}$ downlink cells with slot based PDCCH monitoring. $N_{cells,min}^{cap-mslot}$ or $N_{cells,min}^{cap-slot}$ can also be predetermined. For example, $N_{cells,min}^{cap-mslot}=1$, or $N_{cells,min}^{cap-slot}=1$.

When a UE (such as the UE 116) is not configured for NR-DC operation, the UE determines a capability to monitor a maximum number of PDCCH candidates and a maximum number of non-overlapped CCEs per N>1 consecutive slots or per slot that corresponds to $N_{cells}^{cap-mslot}$ downlink cells or to $N_{cells}^{cap-slot}$ downlink cells, respectively. Here, $N_{cells}^{cap-mslot}$ is the number of configured downlink serving cells if the UE does not provide pdcch-BlindDetectionCA-mslot; otherwise, (i) if the UE reports only one combination of (pdcch-BlindDetectionCA-mslot, pdcch-BlindDetectionCA-slot), $N_{cells}^{cap-mslot}$ is the value of pdcch-BlindDetectionCA-mslot (ii) else, $N_{cells}^{cap-mslot}$ is the value of pdcch-BlindDetectionCA-nislot from a combination of (pdcch-BlindDetectionCA-mslot, pdcch-BlindDetectionCA-slot) that is provided by pdcch-BlindDetectionCA-Comb-indicator. Additionally, $N_{cells}^{cap-slot}$ is the number of configured downlink serving cells if the UE does not provide pdcch-BlindDetectionCA-slot; otherwise, (i) if the UE reports only one combination of (pdcch-BlindDetectionCA-mslot, pdcch-BlindDetectionCA-slot), $N_{cells}^{cap-slot}$ the value of pdcch-BlindDetectionCA-slot (ii) else, $N_{cells}^{cap-slot}$ is the value of pdcch-BlindDetectionCA-slot from a combination of (pdcch-BlindDetectionCA-mslot, pdcch-BlindDetectionCA-slot) that is provided by pdcch-BlindDetectionCA-Comb-indicator.

When a UE (such as the UE 116) is configured for (i) NR-DC operation and (ii) multi-slot based PDCCH monitoring for at least $N_{cells,min}^{cap-mslot}$ downlink cells and for slot based PDCCH monitoring for at least $N_{cells,min}^{cap-slot}$ downlink cells where the UE monitors PDCCH, the UE determines a capability to monitor a maximum number of PDCCH candidates and a maximum number of non-overlapped CCEs that corresponds to one of the following options. In a first option, $N_{cells}^{cap-slot}=N_{cells,slot}^{MCG}$ downlink cells for the MCG where $N_{cells,slot}^{MCG}$ is provided by pdcch-BlindDetection-slot for the MCG. In a second options, $N_{cells}^{cap-slot}=N_{cells,slot}^{SCG}$ downlink cells for the SCG where $N_{cells,slot}^{SCG}$ is provided by pdcch-BlindDetection-slot for the SCG. In a third option, $N_{cells}^{cap-mslot}=N_{cells,mslot}^{MCG}$ downlink cells for the MCG where $N_{cells,mslot}^{MCG}$ is provided by pdcch-BlindDetection-mslot for the MCG. In a fourth option, $N_{cells,mslot}^{cap-mslot}=N_{cells,mslot}^{SCG}$ downlink cells for the SCG where $N_{cells,mslot}^{SCG}$ is provided by pdcch-BlindDetection-mslot for the SCG.

When a UE is configured for CA operation over more than $N_{cells,min}^{cap-mslot}+N_{cells,min}^{cap-slot}$ downlink cells with at least $N_{cells,min}^{cap-mslot}$ downlink cells with multi-slot PDCCH monitoring over N>1 consecutive slots and at least $N_{cells,min}^{cap-slot}$ downlink cells with slot based PDCCH monitoring, or for a cell group when the UE is configured for NR-DC operation, the UE does not expect to perform both of the following two operations. In the first operation, the UE does not expect to monitor per slot a number of PDCCH candidates or a number of non-overlapped CCEs that is larger than the maximum number as derived from the corresponding value of $N_{cells}^{cap-slot}$. In the second operation, the UE does not expect to monitor per N>1 consecutive slots a number of PDCCH candidates or a number of non-overlapped CCEs that is larger than the maximum number as derived from the corresponding value of $N_{cells}^{cap-mslot}$.

When a UE is configured for (i) NR-DC operation with a total of $N_{NR-DC}^{DL,cell}$ downlink cells on both the MCG and the SCG and the (ii) slot based PDCCH monitoring for $N_{NR-DC,slot}^{DL,cell}$ downlink cells and for multi-slot based PDCCH monitoring for $N_{NR-DC,mslot}^{DL,cell}$ downlink cells where the UE monitors PDCCH, the UE expects to be provided pdcch-BlindDetection-slot and pdcch-BlindDetection-mslot for the MCG, and pdcch-BlindDetection-slot and pdcch-BlindDetection-mslot for the SCG with values that satisfy a first condition and a second condition. The first condition is satisfied when either (i) pdcch-BlindDetection-slot for Equation (3) if the UE reports pdcch-BlindDetectionCA-slot, or (ii) pdcch-BlindDetection-slot for Equation (4) if the UE does not report pdcch-BlindDetectionCA-slot, are true. The second condition is satisfied when either (i) pdcch-BlindDetection-mslot for Equation (5) if the UE reports pdcch-BlindDetectionCA-mslot, or (ii) pdcch-BlindDetection-mslot for Equation (6) if the UE does not report pdcch-BlindDetectionCA-mslot are true.

$$MCG+\text{pdcch-BlindDetection-slot for } SCG <= \text{pdcch-BlindDetection}CA\text{-slot} \quad (3)$$

$$MCG+\text{pdcch-BlindDetection-slot} <= N_{NR-DC,slot}^{DL,cell} \quad (4)$$

$$MCG+\text{pdcch-BlindDetection-mslot for } SCG <= \text{pdcch-BlindDetection}CA\text{-mslot} \quad (5)$$

$$MCG+\text{pdcch-BlindDetection-mslot} <= N_{NR-DC,mslot}^{DL,cell} \quad (6)$$

When a UE is configured for (i) NR-DC operation and (ii) multi-slot based PDCCH monitoring for at least $N_{cells,min}^{cap-mslot}$ downlink cells and slot based PDCCH monitoring for at least $N_{cells,min}^{cap-slot}$ downlink cells where the UE monitors PDCCH, the UE can indicate through pdcch-BlindDetectionMCG-UE-slot and pdcch-BlindDetectionSCG-UE-slot respective maximum values for pdcch-BlindDetection-slot for the MCG and pdcch-BlindDetection-slot for the SCG, and can indicate through pdcch-BlindDetectionMCG-UE-mslot and pdcch-BlindDetectionSCG-UE-mslot respective maximum values for pdcch-BlindDetection-mslot for the MCG and pdcch-BlindDetection-mslot for the SCG.

If the UE reports pdcch-BlindDetectionCA-slot, then (i) the value range of pdcch-BlindDetectionMCG-UE-slot or of pdcch-BlindDetectionSCG-UE-slot is [1, ..., pdcch-BlindDetectionCA-slot-1] and (ii) Equation (7) is true. Otherwise, if $N_{NR-DC,max,slot}^{DL,cell}$ is a maximum total number of downlink cells for which the UE is configured with slot based PDCCH monitoring and the UE is configured on both the MCG and the SCG for NR-DC, the (i) the value range of pdcch-BlindDetectionMCG-UE-slot or of pdcch-BlindDetectionSCG-UE-slot is [0, 1, 2], and (ii) Equation (8) is true.

$$\text{pdcch-BlindDetection}MCG\text{-UE-slot}+\text{pdcch-BlindDetection}SCG\text{-UE-slot} >= \text{pdcch-BlindDetection}CA\text{-slot} \quad (7)$$

$$\text{pdcch-BlindDetection}MCG\text{-UE-slot}+\text{pdcch-BlindDetection}SCG\text{-UE-slot} >= N_{NR-DC,max,slot}^{DL,cell} \quad (8)$$

If the UE reports pdcch-BlindDetectionCA-mslot, then the value range of pdcch-BlindDetectionMCG-UE-mslot or of pdcch-BlindDetectionSCG-UE-mslot is [1, ..., pdcch-BlindDetectionCA-mslot-1] and Equation (9) is true. Otherwise, if $N_{NR-DC,max,mslot}^{DL,cell}$ is maximum total number of downlink cells for which the UE is configured with multi-slot based PDCCH monitoring and the UE is configured on both the MCG and the SCG for NR-DC, (i) the value range of pdcch-BlindDetectionMCG-UE-mslot or of pdcch-Blind- DetectionSCG-UE-mslot is $[0, 1, \ldots N_{cells,min}^{cap-mslot}]$ or $[0, 1, 2]$ or 1, and Equation (10) is true $$\text{pdcch-BlindDetection}MCG\text{-UE-}m\text{slot} + \text{pdcch-BlindDetection}SCG\text{-UE-}m\text{slot} \geq \text{pdcch-BlindDetection}CA\text{-}m\text{slot} \quad (9)$$

$$\text{pdcch-BlindDetection}MCG\text{-UE-}m\text{slot} + \text{pdcch-BlindDetection}SCG\text{-UE-}m\text{slot} \geq N_{NR-DC,max,mslot}^{DL,cell} \quad (10)$$

In a third case of cell classification for partitioning a limit of PDCCH BDs/non-overlapped CCEs, the UE is configured with multi-slot based PDCCH monitoring and for span-based PDCCH monitoring. The UE can report, for example in UE-NR-Capability, a CA capability larger than $N_{cells,min}^{cap-mslot}$ downlink cells for multi-slot based PDCCH monitoring or larger than $N_{cells,min}^{cap-span}$ downlink cells for span based PDCCH monitoring. The CA capability can be included in an indication for a maximum number of PDCCH candidates and a maximum number of non-overlapped CCEs the UE can monitor for downlink cells with multi-slot based PDCCH monitoring or for downlink cells with span based PDCCH monitoring when the UE is configured for CA operation over more than $N_{cells,min}^{cap-mslot}$+$N_{cells,min}^{cap-span}$ downlink cells with at least $N_{cells,min}^{cap-mslot}$ downlink cell and at least $N_{cells,min}^{cap-span}$ downlink cells. $N_{cells,min}^{cap-mslot}$ or $N_{cells,min}^{cap-span}$ can also be predetermined such as $N_{cells,min}^{cap-mslot}=2$ or $N_{cells,min}^{cap-span}=2$.

When a UE is not configured for NR-DC operation, the UE determines a capability to monitor a maximum number of PDCCH candidates and a maximum number of non-overlapped CCEs per N>1 consecutive slots or per span that corresponds to $N_{cells}^{cap-mslot}$ downlink cells or to $N_{cells}^{cap-span}$ downlink cells, respectively (where $N_{cells}^{cap-mslot}$ is the number of configured downlink serving cells if the UE does not provide pdcch-BlindDetectionCA-mslot). Otherwise if the UE reports only one combination of (pdcch-BlindDetectionCA-mslot, pdcch-BlindDetectionCA-span), $N_{cells}^{cap-mslot}$ is the value of pdcch-BlindDetectionCA-mslot, else, $N_{cells}^{cap-mslot}$ is the value of pdcch-BlindDetectionCA-mslot from a combination of (pdcch-BlindDetectionCA-mslot, pdcch-BlindDetectionCA-span) that is provided by pdcch-BlindDetectionCAComb-indicator. Additionally, $N_{cells}^{cap-span}$ is the number of configured downlink serving cells of the UE does not provide pdcch-BlindDetectionCA-span. Otherwise, if the UE reports only one combination of (pdcch-BlindDetectionCA-mslot, pdcch-BlindDetectionCA-span), $N_{cells}^{cap-span}$ is the value of pdcch-BlindDetectionCA-span, else, $N_{cells}^{cap-span}$ is the value of pdcch-BlindDetectionCA-span from a combination of (pdcch-BlindDetectionCA-mslot, pdcch-BlindDetectionCA-span) that is provided by pdcch-BlindDetectionCA-Comb-indicator.

When a UE is configured for (i) NR-DC operation and (ii) multi-slot based PDCCH monitoring for at least $N_{cells,min}^{cap-mslot}$ downlink cells and for span based PDCCH monitoring for at least $N_{cells,min}^{cap-span}$ downlink cells where the UE monitors PDCCH, the UE determines a capability to monitor a maximum number of PDCCH candidates and a maximum number of non-overlapped CCEs that corresponds to one of the following four options. In a first option, $N_{cells}^{cap-span}=N_{cells,span}^{MCG}$ downlink cells for the MCG where $N_{cells,span}^{MCG}$ is provided by pdcch-BlindDetection-span for the MCG. In a second option, $N_{cells}^{cap-span}=N_{cells,span}^{SCG}$ downlink cells for the SCG where $N_{cells,span}^{SCG}$ is provided by pdcch-BlindDetection-span for the SCG. In a third option, $N_{cells}^{cap-mslot}=N_{cells,mslot}^{MCG}$ downlink cells for the MCG where $N_{cells,mslot}^{MCG}$ is provided by pdcch-BlindDetection-mslot for the MCG. In a fourth option, $N_{cells}^{cap-mslot}=N_{cells,mslot}^{SCG}$ downlink cells for the SCG where $N_{cells,mslot}^{SCG}$ is provided by pdcch-BlindDetection-mslot for the SCG.

When a UE is configured for CA operation over more than $N_{cells,min}^{cap-span}+N_{cells,min}^{cap-mslot}$ downlink cells with at least $N_{cells,min}^{cap-mslot}$ downlink cells configured with multi-slot based PDCCH monitoring and at least $N_{cells,min}^{cap-span}$ downlink cells configured with span based PDCCH monitoring, or for a cell group when the UE is configured for NR-DC operation, the UE does not expect to perform both of the following two operations. In the first operation, the UE does not expect to monitor per span a number of PDCCH candidates or a number of non-overlapped CCEs that is larger than the maximum number as derived from the corresponding value of $N_{cells}^{cap-span}$. In the second operation, the UE does not expect to monitor per N>1 consecutive slots a number of PDCCH candidates or a number of non-overlapped CCEs that is larger than the maximum number as derived from the corresponding value of $N_{cells}^{cap-mslot}$.

When a UE is configured for NR-DC operation with a total of $N_{NR-DC}^{DL,cell}$ downlink cells on both the MCG and the SCG and the UE is configured with span based PDCCH monitoring for $N_{NR-DC,span}^{DL,cell}$ downlink cells and with multi-slot based PDCCH monitoring for $N_{NR-DC,mslot}^{DL,cell}$ downlink cells where the UE monitors PDCCH, the UE expects to be provided pdcch-BlindDetection-span and pdcch-BlindDetection-mslot for the MCG, and pdcch-BlindDetection-span and pdcch-BlindDetection-mslot for the SCG with values that satisfy the following two conditions. The first condition is satisfied when either (i) Equation (11), if the UE reports pdcch-BlindDetectionCA-span, or (ii) Equation (12), if the UE does not report pdcch-BlindDetectionCA-span, are true. The second condition is satisfied when either (i) Equation (13), if the UE reports pdcch-BlindDetectionCA-mslot, or (ii) Equation (14), if the UE does not report pdcch-BlindDetectionCA-mslot, are true.

$$\text{pdcch-BlindDetection-span for } MCG + \text{pdcch-BlindDetection-span for } SCG \leq \text{pdcch-BlindDetection}CA\text{-span} \quad (11)$$

$$\text{pdcch-BlindDetection-span for } MCG + \text{pdcch-BlindDetection-span} \leq N_{NR-DC,span}^{DL,cell} \quad (12)$$

$$\text{pdcch-BlindDetection-}m\text{slot for } MCG + \text{pdcch-BlindDetection-}m\text{slot for } SCG \leq \text{pdcch-BlindDetection}CA\text{-}m\text{slot} \quad (13)$$

$$\text{pdcch-BlindDetection-}m\text{slot for } MCG + \text{pdcch-BlindDetection-}m\text{slot} \leq N_{NR-DC,mslot}^{DL,cell} \quad (14)$$

When a UE is configured for NR-DC operation and the UE is with multi-slot PDCCH monitoring for at least $N_{cell,min}^{cap-mslot}$ downlink cells and with span based PDCCH monitoring for at least $N_{cell,min}^{vsp-span}$ downlink cells where the UE monitors PDCCH, the UE may indicate by pdcch-BlindDetectionMCG-UE-span and pdcch-BlindDetectionSCG-UE-span respective maximum values for pdcch-BlindDetection-span for the MCG and pdcch-BlindDetection-span for the SCG, and by pdcch-BlindDetectionMCG-UE-mslot and pdcch-BlindDetectionSCG-UE-mslot respective maximum values for pdcch-BlindDetection-mslot for the MCG and pdcch-BlindDetection-mslot for the SCG.

If the UE reports pdcch-BlindDetectionCA-span, then the value range of pdcch-BlindDetectionMCG-UE-span or of pdcch-BlindDetectionSCG-UE-span is $[1, \ldots, \text{pdcch-BlindDetectionCA-span-1}]$ and Equation (15) is true. Otherwise, if $N_{NR-DC,max,span}^{DL,cell}$ is a maximum total number of downlink cells for which the UE is configured with span based PDCCH monitoring and the UE is configured on both the MCG and the SCG for NR-DC, then the value range of pdcch-BlindDetectionMCG-UE-span or of pdcch-BlindDetectionSCG-UE-span is [0, 1, 2], and Equation (16) is true.

$$\text{pdcch-BlindDetection}MCG\text{-UE-span+pdcch-BlindDetection}SCG\text{-UE-span} \geq \text{pdcch-BlindDetection}CA\text{-span} \quad (15)$$

$$\text{pdcch-BlindDetection}MCG\text{-UE-span+pdcch-BlindDetection}SCG\text{-UE-span} \geq N_{NR\text{-}DC,max,span}^{DL,cell} \quad (16)$$

If the UE reports pdcch-BlindDetectionCA-mslot, the value range of pdcch-BlindDetectionMCG-UE-mslot or of pdcch-BlindDetectionSCG-UE-mslot is [1, . . . , pdcch-BlindDetectionCA-mslot-1] and Equation (17) is true. Otherwise, if $N_{NR\text{-}DC,max,mslot}^{DL,cell}$ is maximum total number of downlink cells for which the UE is configured with multi-slot based PDCCH monitoring and the UE is configured on both the MCG and the SCG for NR-DC, then the value range of pdcch-BlindDetectionMCG-UE-r17 or of pdcch-BlindDetectionSCG-UE-r17 is [0, 1, . . . , $N_{cells,min}^{cap\text{-}mslot}$] or [0, 1, 2] or 1, and Equation (18) is true.

$$\text{pdcch-BlindDetection}MCG\text{-UE-mslot+pdcch-BlindDetection}SCG\text{-UE-mslot} \geq \text{pdcch-BlindDetection}CA\text{-mslot} \quad (17)$$

$$\text{pdcch-BlindDetection}MCG\text{-UE-mslot+pdcch-BlindDetection}SCG\text{-UE-mslot} \geq N_{NR\text{-}DC,max,r17}^{DL,cell} \quad (18)$$

In a fourth case of cell classification for partitioning a limit of PDCCH BDs/non-overlapped CCEs, the UE is configured with multi-slot based PDCCH monitoring, span based PDCCH monitoring, and slot based PDCCH monitoring. The UE can report, for example in UE-NR-Capability, a CA capability larger than $N_{cells,min}^{cap\text{-}mslot}$ downlink cells with multi-slot based PDCCH monitoring, larger than $N_{cells,min}^{cap\text{-}span}$ downlink cells with span based PDCCH monitoring, or larger than $N_{cells,min}^{cap\text{-}slot}$ downlink cells with slot based PDCCH monitoring. The CA capability can be included in an indication for a maximum number of PDCCH candidates and a maximum number of non-overlapped CCEs the UE can monitor for downlink cells with multi-slot based PDCCH monitoring, for downlink cells with span based PDCCH monitoring, for downlink cells with slot based PDCCH monitoring, when the UE is configured for CA operation over more than $N_{cells,min}^{cap\text{-}mslot}+N_{cells,min}^{cap\text{-}span}+N_{cells,min}^{cap\text{-}slot}$ downlink cells with at least $N_{cells,min}^{cap\text{-}mslot}$ downlink cells with multi-slot based PDCCH monitoring, at least $N_{cells,min}^{cap\text{-}span}$ downlink cells with span based PDCCH monitoring, and at least $N_{cells,min}^{cap\text{-}slot}$ downlink cells with slot based PDCCH monitoring. Any of $N_{cells,min}^{cap\text{-}mslot}$, $N_{cells,min}^{cap\text{-}span}$ or $N_{cells,min}^{cap\text{-}slot}$ can be predetermined. For example $N_{cells}^{rel\text{-}mslot}=2$, or $N_{cells}^{rel\text{-}span}=2$, or $N_{cells}^{rel\text{-}slot}=2$.

When a UE is not configured for NR-DC operation, the UE determines a capability to monitor a maximum number of PDCCH candidates and a maximum number of non-overlapped CCEs per N>1 consecutive slots, per span, or per slot that corresponds to $N_{cells}^{cap\text{-}mslot}$ downlink cells, to $N_{cells}^{cap\text{-}span}$ downlink cells, or to N downlink cells, respectively. In this example, $N_{cells}^{cap\text{-}mslot}$ is the number of configured downlink serving cells if the UE does not provide pdcch-BlindDetectionCA-mslot, otherwise, if the UE reports only one combination of (pdcch-BlindDetectionCA-mslot, pdcch-BlindDetectionCA-span, pdcch-BlindDetectionCA-slot), $N_{cells}^{cap\text{-}mslot}$ is the value of pdcch-BlindDetectionCA-mslot else, $N_{cells}^{cap\text{-}mslot}$ is the value of pdcch-BlindDetectionCA-mslot from a combination of (pdcch-BlindDetectionCA-mslot, pdcch-BlindDetectionCA-span, pdcch-BlindDetectionCA-slot) that is provided by pdcch-BlindDetectionCAComb-indicator. Additionally, in this example, $N_{cells}^{cap\text{-}span}$ is the number of configured downlink serving cells if the UE does not provide pdcch-BlindDetectionCA-span, otherwise, if the UE reports only one combination of (pdcch-BlindDetectionCA-mslot, pdcch-BlindDetectionCA-span, pdcch-BlindDetectionCA-slot), $N_{cells}^{cap\text{-}span}$ is the value of pdcch-BlindDetectionCA-span, else, $N_{cells}^{cap\text{-}span}$ is the value of pdcch-BlindDetectionCA-span from a combination of (pdcch-BlindDetectionCA-mslot, pdcch-BlindDetectionCA-span, pdcch-BlindDetectionCA-slot) that is provided by pdcch-BlindDetectionCAComb-indicator. Moreover, in this example, $N_{cells}^{cap\text{-}slot}$ is the number of configured downlink serving cells if the UE does not provide pdcch-BlindDetectionCA-slot, otherwise, if the UE reports only one combination of (pdcch-BlindDetectionCA-mslot, pdcch-BlindDetectionCA-span, pdcch-BlindDetectionCA-slot), $N_{cells}^{cap\text{-}slot}$ is the value of pdcch-BlindDetectionCA-slot, else, $N_{cells}^{cap\text{-}slot}$ is the value of pdcch-BlindDetectionCA-slot from a combination of (pdcch-BlindDetectionCA-mslot, pdcch-BlindDetectionCA-span, pdcch-BlindDetectionCA-slot) that is provided by pdcch-BlindDetectionCAComb-indicator.

When a UE is configured for NR-DC operation and the UE is configured multi-slot PDCCH monitoring for at least $N_{cells,min}^{cap\text{-}mslot}$ downlink cells, span PDCCH monitoring for at least $N_{cells,min}^{cap\text{-}span}$ downlink cells, and slot PDCCH monitoring for at least $N_{cells,min}^{cap\text{-}slot}$ downlink cells where the UE monitors PDCCH, the UE determines a capability to monitor a maximum number of PDCCH candidates and a maximum number of non-overlapped CCEs that corresponds to one of the following six options. In a first option $N_{cells}^{cap\text{-}slot}=N_{cells,slot}^{MCG}$ downlink cells for the MCG where $N_{cells,slot}^{MCG}$ is provided by pdcch-BlindDetection-slot for the MCG. In a second option, $N_{cells}^{cap\text{-}slot}=N_{cells,slot}^{SCG}$ downlink cells for the SCG where $N_{cells,slot}^{SCG}$ slot is provided by pdcch-BlindDetection-slot for the SCG. In a third option, $N_{cells}^{cap\text{-}span}=N_{cells,span}^{MCG}$ downlink cells for the MCG where $N_{cells,span}^{MCG}$ is provided by pdcch-BlindDetection-span for the MCG. In a fourth option, $N_{cells}^{cap\text{-}span}=N_{cells,span}^{SCG}$ downlink cells for the SCG where $N_{cells,span}^{SCG}$ is provided by pdcch-BlindDetection-span for the SCG. In a fifth option, $N_{cells}^{cap\text{-}mslot}=N_{cells,mslot}^{MCG}$ downlink cells for the MCG where $N_{cells,mslot}^{MCG}$ is provided by pdcch-BlindDetection-mslot for the MCG. In a six option $N_{cells}^{cap\text{-}mslot}=N_{cells,mslot}^{SCG}$ downlink cells for the SCG where $N_{cells,mslot}^{SCG}$ provided by pdcch-BlindDetection-mslot for the SCG.

When a UE is configured for CA operation over more than $N_{cells,min}^{cap\text{-}mslot}+N_{cells,min}^{cap\text{-}span}+N_{cells,min}^{cap\text{-}slot}$ downlink cells with at least $N_{cells,min}^{cap\text{-}mslot}$ downlink cells with multi-slot based PDCCH monitoring, at least $N_{cells,min}^{cap\text{-}span}$ downlink cells with span-based PDCCH monitoring, and at least $N_{cells,min}^{cap\text{-}slot}$ downlink cells with slot based PDCCH monitoring, or for a cell group when the UE is configured for NR-DC operation, the UE does not expect to perform both of the following three operations. In the first operation, the UE does not expect to monitor per slot a number of PDCCH candidates or a number of non-overlapped CCEs that is larger than the maximum number as derived from the corresponding value of $N_{cells}^{cap\text{-}slot}$. In the second operation, the UE does not expect to monitor per span a number of PDCCH candidates or a number of non-overlapped CCEs that is larger than the maximum number as derived from the corresponding value of $N_{cells}^{cap-span}$. In the third operation, the UE does not expect to monitor per N>1 consecutive slots a number of PDCCH candidates or a number of non-overlapped CCEs that is larger than the maximum number as derived from the corresponding value of $N_{cells}^{cap-mslot}$.

When a UE is configured for NR-DC operation with a total of $N_{NR-DC}^{DL,cell}$ downlink cells on both the MCG and the SCG and the UE is configured for slot based PDCCH monitoring for $N_{NR-DC,slot}^{DL,cell}$ downlink cells, for span based PDCCH monitoring for $N_{NR-DC,span}^{DL,cell}$ downlink cells, and for multi-slot based PDCCH monitoring for $N_{NR-DC,mslot}^{DL,cell}$ downlink cells where the UE monitors PDCCH, the UE expects to be provided pdcch-BlindDetection-slot, pdcch-BlindDetection-span and pdcch-BlindDetection-mslot for the MCG, and pdcch-BlindDetection-slot, pdcch-BlindDetection-span and pdcch-BlindDetection-mslot for the SCG with values that satisfy a first condition, a second condition and a third condition. The first condition is satisfied when either Equation (19) or Equation (20) are true. The second condition is satisfied when either Equation (21) or Equation (22) are true. The third condition is satisfied when either Equation (23) or Equation (24) are true.

pdcch-BlindDetection-slot for $MCG$+pdcch-BlindDetection-slot for $SCG$<=pdcch-BlindDetection$CA$-slot, if the UE reports pdcch-BlindDetection$CA$-slot (19)

pdcch-BlindDetection-slot for $MCG$+pdcch-BlindDetection-slot<=$N_{NR-DC,slot}^{DL,cell}$, if the UE does not report pdcch-BlindDetection$CA$-slot (20)

pdcch-BlindDetection-span for $MCG$+pdcch-BlindDetection-span for $SCG$<=pdcch-BlindDetection$CA$-span, if the UE reports pdcch-BlindDetection$CA$-span (21)

pdcch-BlindDetection-span for $MCG$+pdcch-BlindDetection-span<=$N_{NR-DC,span}^{DL,cell}$, if the UE does not report pdcch-BlindDetection$CA$-span (22)

pdcch-BlindDetection-mslot for $MCG$+pdcch-BlindDetection-mslot for $SCG$<=pdcch-BlindDetection$CA$-mslot, if the UE reports pdcch-BlindDetection$CA$-mslot (23)

pdcch-BlindDetection-mslot for $MCG$+pdcch-BlindDetection-mslot<=$N_{NR-DC,mslot}^{DL,cell}$, if the UE does not report pdcch-BlindDetection$CA$-mslot (24)

When a UE is configured for NR-DC operation and the UE is configured for multi-slot based PDCCH monitoring for at least $N_{cells,min}^{cap-mslot}$ downlink cells, for span based PDCCH monitoring for at least $N_{cells,min}^{cap-span}$ downlink cells and for slot based PDCCH monitoring for at least $N_{cells,min}^{cap-slot}$ downlink cells where the UE monitors PDCCH, the UE may indicate, by pdcch-BlindDetectionMCG-UE-slot and pdcch-BlindDetectionSCG-UE-slot respective maximum values for pdcch-BlindDetection-slot for the MCG and pdcch-BlindDetection-slot for the SCG, and by pdcch-BlindDetectionMCG-UE-span and pdcch-BlindDetectionSCG-UE-span respective maximum values for pdcch-BlindDetection-span for the MCG and pdcch-BlindDetection-span for the SCG, and by pdcch-BlindDetectionMCG-UE-mslot and pdcch-BlindDetectionSCG-UE-mslot, respective maximum values for pdcch-BlindDetection-mslot for the MCG and pdcch-BlindDetection-mslot for the SCG.

If the UE reports pdcch-BlindDetectionCA-slot, then the value range of pdcch-BlindDetectionMCG-UE-slot or of pdcch-BlindDetectionSCG-UE-slot is [1, . . . , pdcch-BlindDetectionCA-slot-1] and Equation (25) is true. Otherwise, if $N_{NR-DC,max,slot}^{DL,cell}$ is a maximum total number of downlink cells for which the UE is configured for slot based PDCCH monitoring and the UE is configured on both the MCG and the SCG for NR-DC, then the value range of pdcch-BlindDetectionMCG-UE-slot or of pdcch-BlindDetectionSCG-UE-slot is [0, 1, 2], and Equation (26) is true.

pdcch-BlindDetection$MCG$-UE-slot+pdcch-BlindDetection$SCG$-UE-slot>=pdcch-BlindDetection$CA$-slot (25)

pdcch-BlindDetection$MCG$-UE-slot+pdcch-BlindDetection$SCG$-UE-slot>=$N_{NR-DC,max,slot}^{DL,cell}$ (26)

If the UE reports pdcch-BlindDetectionCA-span, then the value range of pdcch-BlindDetectionMCG-UE-span or of pdcch-BlindDetectionSCG-UE-span is [1, . . . , pdcch-BlindDetectionCA-span-1] and Equation (27) is true. Otherwise, if $N_{NR-DC,max,span}^{DL,cell}$ is a maximum total number of downlink cells for which the UE is configured with span based PDCCH monitoring and the UE is configured on both the MCG and the SCG for NR-DC, then the value range of pdcch-BlindDetectionMCG-UE-span or of pdcch-BlindDetectionSCG-UE-span is [0, 1, 2], and Equation (28) is true.

pdcch-BlindDetection$MCG$-UE-span+pdcch-BlindDetection$SCG$-UE-span>=pdcch-BlindDetection$CA$-span (27)

pdcch-BlindDetection$MCG$-UE-span+pdcch-BlindDetection$SCG$-UE-span>=$N_{NR-DC,max,span}^{DL,cell}$ (28)

If the UE reports pdcch-BlindDetectionCA-mslot, then the value range of pdcch-BlindDetectionMCG-UE-mslot or of pdcch-BlindDetectionSCG-UE-mslot is [1, . . . , pdcch-BlindDetectionCA-mslot-1] and Equation (29) is true. Otherwise, if $N_{NR-DC,max,mslot}^{DL,cell}$ is a maximum total number of downlink cells for which the UE is configured with multi-slot based PDCCH monitoring the UE is configured on both the MCG and the SCG for NR-DC, then the value range of pdcch-BlindDetectionMCG-UE-mslot or of pdcch-BlindDetectionSCG-UE-mslot is [0, 1, . . . , $N_{cells}^{rel-mslot}$] or, [0, 1, 2], and Equation (30) is true.

pdcch-BlindDetection$MCG$-UE-mslot+pdcch-BlindDetection$SCG$-UE-mslot>=pdcch-BlindDetection$CA$-mslot (29)

pdcch-BlindDetection$MCG$-UE-mslot+pdcch-BlindDetection$SCG$-UE-mslot>=$N_{NR-DC,max,mslot}^{DL,cell}$ (30)

In addition to the above value ranges of [0, 1, 2], when applicable, a condition that a total sum of the three values from the value ranges does not exceed four can apply in order to maintain a same UE capability as when a UE does not support multi-slot based PDCCH scheduling.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure describe dynamic switching of PDCCH monitoring capability. This is described in the following examples and embodiments, such as those of FIGS. 7 and 8. That is, embodiments of the disclosure considers an adaptation of a PDCCH monitoring capability for a serving cell based on an indication provided by a DCI format. A field in the DCI format providing the indication is referred as PDCCH monitoring capability switching (PMCS) indicator field in this disclosure.

Figure 7:
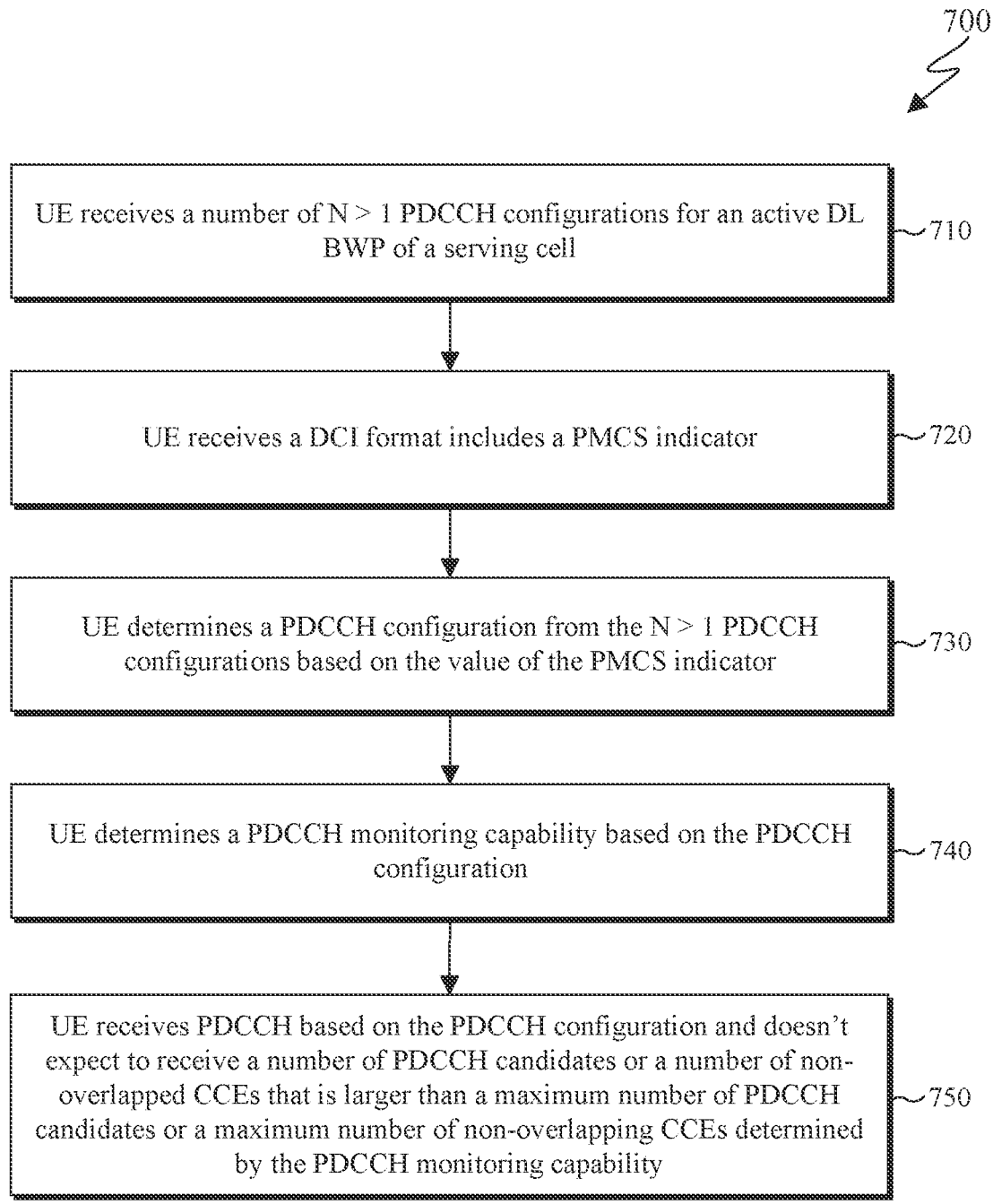
FIGS. 7 and 8 illustrate examples method for dynamically adapting a PDCCH monitoring capability for an active downlink (DL) bandwidth part (BWP) of a serving cell according to embodiments of the present disclosure.
Figure 8:
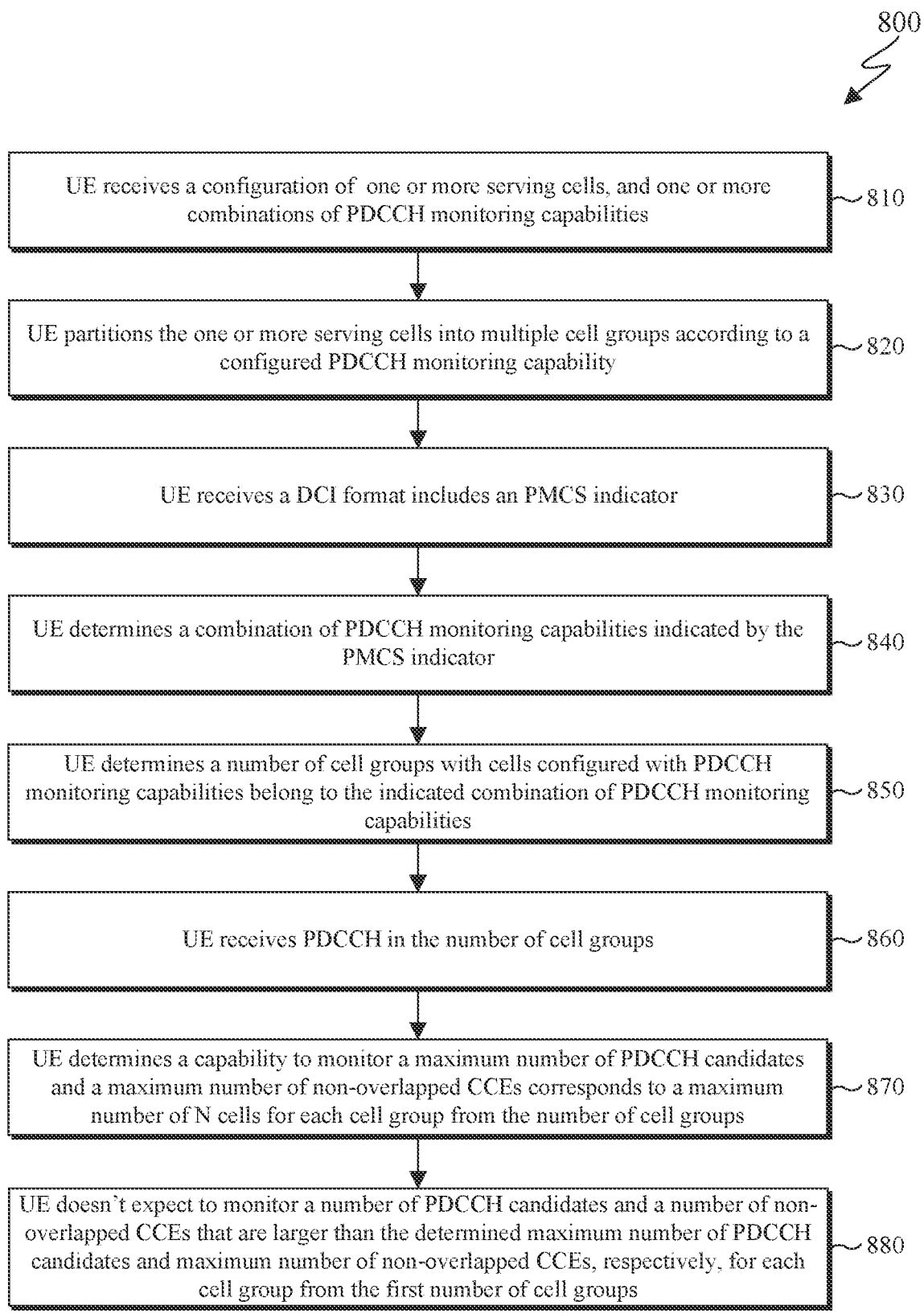

FIGS. 7 and 8 illustrate examples method 700 and 800, respectively, for dynamically adapting a PDCCH monitoring capability for an active DL BWP of a serving cell according to embodiments of the present disclosure. The steps of the method 700 of FIG. 7 and the method 800 of FIG. 8 can be performed by any of the UEs 111-116 of FIG. 1, such as the UE 116 of FIG. 3. The methods 700 and 800 are for illustration only and other embodiments can be used without departing from the scope of the present disclosure.

In certain embodiments, to support dynamic adaptation of PDCCH monitoring capability, a UE (such as the UE 116) supports multiple PDCCH monitoring capabilities. A PDCCH monitoring capability can be a slot based PDCCH monitoring capability, a span based PDCCH monitoring capability, or a multi-slot based PDCCH monitoring as defined in the first embodiment of this disclosure.

In a first approach of dynamic adaptation for a PDCCH monitoring capability of a UE (such as the UE 116), the UE can be configured a number of $N_{PDCCH}^{config}>1$ PDCCH configurations for an active DL BWP of a serving cell. A PDCCH configuration is associated with a PDCCH monitoring capability and can be provided via a parameter in the PDCCH configuration, such as by a monitoringCapabilny-Config in PDCCH-Config, wherein PDCCH-Config is described in REF5. A PMCS indicator value provides one of the $N_{PDCCH}^{config}>1$ PDCCH configurations for the active DL BWP of the serving cell by providing an index of a PDCCH configuration from the $N_{PDCCH}^{config}$ PDCCH configurations. For example, the PMCS indicator can comprise of one bit, wherein values of "0" and "1" indicate respective first and second PDCCH configurations for an active DL BWP of a serving cell associated with the DCI format. When the UE is configured with CA operation and for indication of a PDCCH configuration for multiple cells, a PMCS indicator can comprise of $N_{groups}>=1$ bits corresponding to $N_{groups}$ cell groups of one or more serving cells, wherein the k-th bit indicates an index of a first or second PDCCH configuration for serving cells from the k-th cell group.

When a UE applies a PDCCH configuration indicated by a PMCS indicator for an active DL BWP of a serving cell, the UE can determine a capability to monitor a maximum number of PDCCH candidates and a maximum number of non-overlapped CCEs based on the PDCCH monitoring capability associated with the PDCCH configuration. The UE monitors PDCCH in an active DL BWP of a serving cell based on the PDCCH configuration and does not expect to monitor any PDCCH configured by the remaining PDCCH configurations for the active DL BWP of the serving cell. A PDCCH configuration can include a number of search space sets or a number of CORESETs. For example, a PDCCH configuration can be provided by PDCCH-Config as described in REF5.

In certain embodiments, a UE can apply a default PDCCH configuration when the UE is configured to receive a PDCCH providing a DCI format including a PMCS indicator and does not correctly decode the DCI format. The default PDCCH configuration can be predetermined or provided by higher layers. For example, the default PDCCH configuration can be the first PDCCH configuration from the $N_{PDCCH}^{config}$ PDCCH configurations. For example, the default PDCCH configuration can be a PDCCH configuration that is associated with PDCCH monitoring capability with a maximum number of PDCCH candidates or a maximum number of non-overlapped CCEs.

The method 700 as illustrated in FIG. 7 describes a first example of a UE procedure for dynamic adaptation of a PDCCH monitoring capability for an active DL BWP of a serving cell.

In step 710, a UE (such as the UE 116) is provided a number of more than one PDCCH configurations for an active DL BWP for a serving cell. in step 720, the UE receives a PDCCH that provides a DCI format, wherein the DCI format includes a PMCS indicator field. In step 730, the UE determines a PDCCH configuration from the number of more than one PDCCH configurations based on the value of the PMCS indicator field. In step 740, the UE determines a PDCCH monitoring corresponding to the PDCCH configuration. The PDCCH monitoring capability determines a maximum number of PDCCH candidates or a maximum number of non-overlapping CCEs within a time unit, for example within a slot or a span. In step 750, the UE receives PDCCH based on the PDCCH configuration and does not expect to receive a number of PDCCH candidates or a number of non-overlapped CCEs within the time unit that is larger than the maximum number of PDCCH candidates or the maximum number of non-overlapping CCEs for the time unit.

In a second approach of dynamic adaptation for a PDCCH monitoring capability, a UE (such as the UE 116) can be configured to support a number of $N_{cells}$ serving cells to monitor PDCCH, wherein for each serving cell the UE is configured with a PDCCH monitoring capability from a total of $N_{PDCCH}^{cap}$ PDCCH monitoring capabilities. The $N_{cells}$ serving cells can be partitioned into a number of $N_{PDCCH}^{cap}$ cell groups according to the configured PDCCH monitoring capability. All cells from a cell group are configured with a same PDCCH monitoring capability. The UE can be triggered to monitor a subset of PDCCH monitoring capabilities from the $N_{PDCCH}^{cap}$ PDCCH monitoring capabilities based on a value of a PMCS indicator field in a DCI format.

When a UE supports the second approach for a dynamic adaptation of PDCCH monitoring capability, the UE can be provided with K>1 combinations of one or more PDCCH monitoring capabilities from the $N_{PDCCH}^{cap}$ PDCCH monitoring capabilities the UE configured for the $N_{cells}$ serving cells.

For triggering a dynamic adaptation of PDCCH monitoring capabilities based on a PMCS indicator field in a DCI format according to the second approach, one of the following two methods can be considered.

In a first method, the PMCS indicator field can be configured to indicate a combination of one or more PDCCH monitoring capabilities from the K>1 combinations of PDCCH monitoring capabilities. When a UE receives a DCI format with a PMCS indicator value that indicates a combination of PDCCH monitoring capabilities, the UE receives PDCCH in a first number of cell groups, wherein all cells from the first number of cell groups are configured with PDCCH monitoring capabilities belong to the combination of PDCCH monitoring capabilities indicated by the PMCS indicator. The UE does not expect to monitor PDCCH in a second number of cells groups, wherein all cells from the second number of cell groups are configured with PDCCH monitoring capabilities that are not included in the combination of PDCCH monitoring capabilities indicated by the value of the PMCS indicator. For example, a UE is configured with four cells to monitor PDCCHs, wherein cell #0 is configured with slot based PDCCH monitoring, cell #1 is configured with span based PDCCH monitoring, and cell #2 and cell #3 are configured with multi-slot based PDCCH. The UE is provided with two combinations of PDCCH monitoring capability, wherein a first combination is {multi-slot based PDCCH monitoring}, a second combination is {slot based PDCCH monitoring, span based PDCCH monitoring, multi-slot based PDCCH monitoring}. A PMCS indicator field is then a binary bit. When the UE receives a DCI format with a PMCS indicator value of "0", the UE monitors PDCCH in cell #2, and cell #3 based on multi-slot PDCCH monitoring and skips PDCCH monitoring in cell #0 and cell #1. When the UE receives a DCI format with a PMCS indicator value of "1", the UE monitors PDCCH in all cells according to the corresponding PDCCH configuration.

In a second method, the PMCS indicator can be a bitmap of K bits, wherein a k-th (k=1, . . . , K) bit from the bitmap indicates to activate or deactivate a k-th combination from the K>1 combinations of one or more PDCCH monitoring capabilities. When a UE receives a DCI format that includes the PMCS indicator with a value that indicates activation of a first set of one or more combinations of PDCCH monitoring capabilities and deactivation of a second set of one or more combinations of PDCCH monitoring capabilities, the UE monitors PDCCH in a first number of cell groups, wherein PDCCH monitoring capabilities for all cells from the first number of cell groups belong to the first set of one or more combinations of PDCCH monitoring capabilities that are activated by the PMCS indicator. The UE does not expect to monitor PDCCH in a second number of cell groups, wherein PDCCH monitoring capabilities for all cells from the second number of cell groups belong to the second set of one or more combinations of PDCCH monitoring capabilities that are deactivated by the PMCS indicator.

When a UE monitors PDCCH in a first number of cell groups with PDCCH monitoring capabilities indicated by a PMCS indicator, the UE determines a capability to monitor a maximum number of PDCCH candidates and a maximum number of non-overlapped CCEs corresponds to a maximum number of $N_{cells}^{cap-X}$ cells for the corresponding PDCCH monitoring capability, X, for a cell group from the first number of cell groups, wherein all cells from the cell group are configured with a PDCCH monitoring capability, X. For each cell group from the first number of cell groups, the UE does not expect to monitor a number of PDCCH candidates and a number of non-overlapped CCEs that are larger than the maximum number of PDCCH candidates and maximum number of non-overlapped CCEs derived based on corresponding $N_{cells}^{cap-X}$ and the PDCCH monitoring capability, X, respectively.

For determining a DCI format to include a PMCS indicator, one of the following two methods can be considered.

In a first method, the DCI format is a DCI format in a CSS that is monitored outside DRX active time, and the PMCS indicator is applied to a next DRX ON duration when the UE wakes up to monitor PDCCH during the next DRX ON duration.

In a second method, the DCI format is a DCI format that schedules a PDSCH reception or a PUSCH transmission. The UE applies the indication from the PMCS indicator field with a time delay after the UE receives the DCI format. The time delay can be predetermined per SCS configuration of the active DL BWP.

The method 800 as illustrated in FIG. 8 describes a second example of UE procedure based on the second approach of dynamic adaptation of PDCCH monitoring capability for a serving cell.

In step 810, a UE (such as the UE 116) is configured one or more serving cells and one or more combinations of PDCCH monitoring capabilities. In step 820, the one or more serving cells are partitioned into multiple cell groups according to a configured PDCCH monitoring capability for each serving cell. Here, all cells in a cell group have same PDCCH monitoring capability. In step 830, the UE receives a DCI format that includes a PMCS indicator field. In step 840, the UE determines that a value of the PMCS indicator field indicates a combination of PDCCH monitoring capabilities from the one or more combinations of PDCCH monitoring capabilities. In step 850, the UE determines a number of cell groups, wherein all cells in a cell group from the number of cell groups map to the indicated combination of PDCCH monitoring capabilities. In step 860, the UE receives PDCCH in the number of cell groups. For each scheduled cell in a cell group from the number of cell groups, the UE in step 870 determines a capability to monitor a maximum number of PDCCH candidates and a maximum number of non-overlapped CCEs corresponds to a maximum number of $N_{cells}^{cap-X}$ cells for the corresponding PDCCH monitoring capability, X, for the cell group. For each cell group from the first number of cell groups, the UE in step 880 does not expect to monitor a number of PDCCH candidates and a number of non-overlapped CCEs that are larger than the maximum number of PDCCH candidates and maximum number of non-overlapped CCEs as derived from the corresponding value of $N_{cells}^{cap-X}$, respectively, for the cell group.

Although FIG. 7 illustrates the method 700 and the FIG. 8 illustrates the method 800 various changes may be made to FIGS. 7 and 8. For example, while the method 700 and the method 800 are shown as a series of steps, various steps could overlap, occur in parallel, occur in a different order, or occur multiple times. In another example, steps may be omitted or replaced by other steps. For example, steps of the method 700 and the method 800 can be executed in a different order.

Embodiments of the present disclosure describe search space sets classification for partitioning BDs/CCEs limits. This is described in the following examples and embodiments, such as those of FIGS. 9 and 10. That is, embodiments of the disclosure considers search space set classification for partitioning a limit of PDCCH BDs/non-overlapped CCEs according to multiple PDCCH monitoring capabilities supported simultaneously within an active DL BW.

Figure 9:
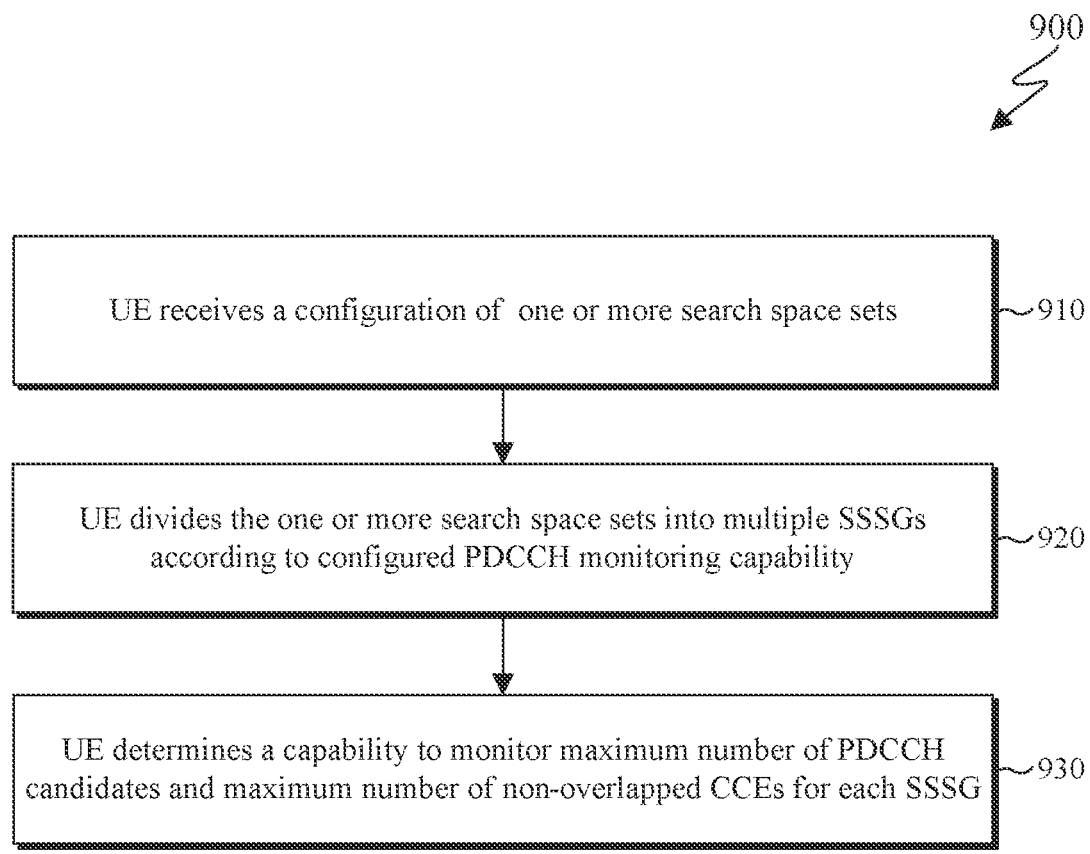
FIG. 9 illustrates an example method for search space set partitioning for BD/CCE limit based on a configuration by higher layers according to embodiments of the present disclosure.
Figure 10:
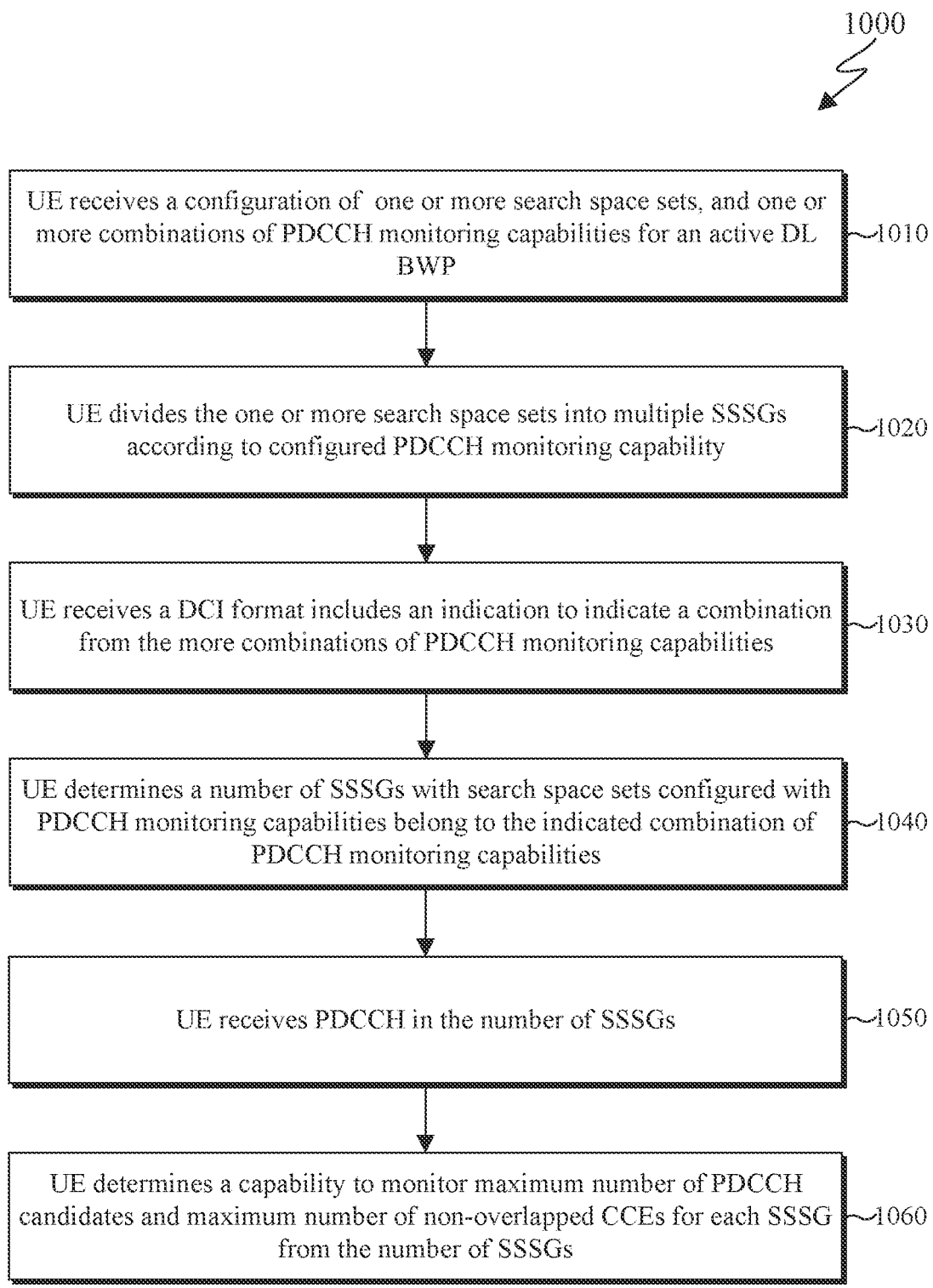
FIG. 10 illustrates an example method for search space set partitioning for a limit of PDCCH BDs/non-overlapped CCEs based on an adaptation triggered by a downlink control information (DCI) format according to embodiments of the present disclosure.

FIG. 9 illustrates an example method 900 for search space set partitioning for BD/CCE limit based on a configuration by higher layers according to embodiments of the present disclosure. FIG. 10 illustrates an example method 1000 for search space set partitioning for a limit of PDCCH BDs/non-overlapped CCEs based on an adaptation triggered by a DCI format according to embodiments of the present disclosure. The steps of the method 900 of FIG. 9 and the method 1000 of FIG. 10 can be performed by any of the UEs 111-116 of FIG. 1, such as the UE 116 of FIG. 3. The methods 900 and 1000 are for illustration only and other embodiments can be used without departing from the scope of the present disclosure.

In certain embodiments, a UE (such as the UE 116) can be configured a total number of $N_{SSS}>1$ search space sets within an active DL BWP of a serving cell. Each search space set from the $N_{SSS}>1$ search space sets is associated with a PDCCH monitoring capability. that can be provided by higher layer signaling. For example, a configuration of a search space set includes a parameter to indicate an associated PDCCH monitoring capability, such as slot based, span based, or multi-slot based. The $N_{SSS}>1$ search space sets can be divided into $N_{PDCCH}^{cap}>1$ search space set groups (SSSGs) according to $N_{PDCCH}^{cap}>1$ associated PDCCH monitoring capabilities, wherein all search space sets from a SSSG are associated with a same PDCCH monitoring capability from the $N_{PDCCH}^{cap}$ PDCCH monitoring capabilities.

For example, the $N_{PDCCH}^{cap}>1$ PDCCH monitoring capabilities can be a combination from following options. An option is a slot based PDCCH monitoring capability. Another option is a span based PDCCH monitoring with a first combination of (X, Y). Another option is a span based PDCCH monitoring with a second combination of (X, Y). Another option is a span based PDCCH monitoring with a third combination of (X, Y). Another option is a multi-slot based PDCCH monitoring as defined in the first embodiment of this disclosure. Another option is a multi-slot based PDCCH monitoring as defined in the first embodiment of this disclosure with a first value of N. Another option is a multi-slot based PDCCH monitoring as defined in the first embodiment of this disclosure with a second value of N Another option is a multi-slot based PDCCH monitoring as defined in the first embodiment of this disclosure with a third value of N.

When a UE is configured to monitor PDCCHs in a DL BWP with $N_{PDCCH}^{cap}>1$ PDCCH monitoring capabilities, the UE determines a maximum number of $M_{cap,n}^{max,\mu}$ PDCCH candidates or a maximum number of $C_{cap,n}^{max,\mu}$ non-overlapping CCEs within a time unit that corresponds to the (n+1)th SSSG associated with (n+1)th PDCCH monitoring capability, where $n=0, \ldots, N_{PDCCH}^{cap}-1$, and $\mu$ is a SCS configuration of the active DL BWP. For each SSSG associated with PDCCH monitoring capability n, the UE does not expect to monitor a number of PDCCH candidates or a number of non-overlapped CCEs that is larger than $M_{cap,n}^{max,\mu}$ or $C_{cap,n}^{max,\mu}$, respectively. When the UE is configured with a number of downlink cells for PDCCH monitoring, the UE can determine a capability to monitor a maximum number of $M_{cap,n}^{total,\mu}$ PDCCH candidates and a maximum number of $C_{cap,n}^{total,\mu}$ that correspond to all downlink scheduled cells with respective search space sets in the active DL BWP of a scheduling cell that are configured with PDCCH monitoring capability n.

In addition to search space set partitioning for a limit of PDCCH BDs/non-overlapped CCEs based on a configuration by higher layers, a UE (such as the UE 116) can be triggered an adaptation of PDCCH monitoring capabilities within an active DL BWP based on an indication by a DCI format.

When a UE is configured with $N_{PDCCH}^{cap}>1$ SSSGs corresponding to $N_{PDCCH}^{cap}$ PDCCH monitoring capabilities for an active DL BWP of a serving cell, the UE can be triggered to monitor a subset of PDCCH monitoring capabilities from the $N_{PDCCH}^{cap}$ PDCCH monitoring capabilities for the active DL BWP of the serving cell based on an indication provided to the UE either by higher layer signalling or by a DCI format in a PDCCH.

For an adaptation of PDCCH monitoring capabilities based on a DCI format, a UE can be provided K>1 combinations of one or more PDCCH monitoring capabilities, wherein each of the one or more PDCCH monitoring capability is from the $N_{PDCCH}^{cap}$ PDCCH monitoring capabilities that are configured by higher layers.

For determining an indication by a DCI format for triggering an adaptation of PDCCH monitoring capabilities, one of the following two methods can be considered. In a first method, a value of an indication field in the DCI format can be configured to provide a combination of one or more PDCCH monitoring capabilities from the multiple combinations. When a UE receives a DCI format that includes the indication field, the UE monitors PDCCH in SSSGs associated with the combination of one or more PDCCH monitoring capabilities indicated by a value of the indication field and does not expect to monitor SSSGs associated with PDCCH monitoring capabilities that are not included in the combination of one or more PDCCH monitoring capabilities.

In a second method, the indication field provides a bitmap in size of K, wherein k-th (k=1, ..., K) bit from the bitmap indicates activation or deactivation of a k-th combination from the K>1 combinations of one or more PDCCH monitoring capabilities. When a UE receives a DCI format that includes the indication field, the UE monitors PDCCH in SSSGs associated with the combinations that are activated by the value of the indication field and does not expect to monitor SSSGs associated with PDCCH monitoring capabilities that are deactivated by the indication.

For determining a DCI format to include an indication field for triggering an adaptation of PDCCH monitoring capabilities by a UE, one of the following two methods can be considered. In a first method, the DCI format is provided by a PDCCH that the UE monitors outside DRX active time, and the indication is applicable for a next DRX ON duration when the UE wakes up to monitor PDCCH during the next DRX ON duration.

In a second method, the DCI format schedules a PDSCH reception or a PUSCH transmission. The value of the indication field is applied with a time delay after the UE receives the DCI format. The time delay can be predetermined per SCS configuration of the active DL BWP.

For a SSSG n where a UE is configured by higher layers or indicated by a DCI format to monitor PDCCH, wherein all search space sets from the SSSG n are associated with a same PDCCH monitoring capability within a PDCCH monitoring time unit, for example a slot, or a span, or multiple slots, denote by $S_{CSS,n}$ a set of CSS sets with cardinality of $I_{CSS,n}$ and by $S_{USS,n}$ a set of USS sets with cardinality of $J_{USS,n}$. The location of USS sets $s_j$, $0 \leq j < J_{USS,n}$, in $S_{USS,n}(j)$ from SSSG n is according to an ascending order of the search space set index. Denote by $M_{S_{CSS,n}(i)}^{(L)}$, $0 \leq i < I_{CSS,n}$, a number of counted PDCCH candidates for monitoring according to CSS set $S_{CSS,n}(i)$ from SSSG n and by $M_{S_{USS,n}(j)}^{(L)}$, $0 \leq j < J_{USS,n}$, a number of counted PDCCH candidates for monitoring according to USS set $S_{USS,n}(j)$ from SSSG n.

For CSS sets from SSSG n where a UE is configured or indicated to monitor PDCCH, the UE monitors $M_{PDCCH}^{CSS,n} = \Sigma_{i=0}^{I_{CSS,n}} \Sigma_L M_{S_{CSS,n}(i)}^{(L)}$, PDCCH candidates requiring a total of $C_{PDCCH}^{CSS,n}$ non-overlapping CCEs in a PDCCH monitoring time unit, for example a slot, or a span, or multiple slots.

Denote by $V_{CCE,n}(S_{USS,n}(j))$ the set of non-overlapping CCEs for search space set $S_{CSS,n}(j)$ from SSSG n and by $\mathcal{C}(V_{CCE,n}(S_{USS,n}(j)))$ the cardinality of $V_{CCE,n}(S_{USS,n}(j))$ where the non-overlapping CCEs for search space set $S_{CSS,n}(j)$ from SSSG n are determined considering the allocated PDCCH candidates for monitoring for the CSS sets SSSG n and the allocated PDCCH candidates for monitoring all search space sets $S_{USS,n}(k)$ SSSG n, $0 \leq k \leq j$.

In certain embodiments, a UE (such as the UE 116) allocates PDCCH candidates per SSSG as described Syntax (1), below.

Syntax (1)

Set $n = 0$ while $n < N_{PDCCH}^{cap}$

Set $M_{PDCCH}^{USS,n} = \min(M_{cap,n}^{total,\mu} \cdot M_{cap,n}^{max,\mu}) - M_{PDCCH}^{CSS,n}$ Set $C_{PDCCH}^{USS,n} = \min(C_{cap,n}^{total,\mu} \cdot C_{cap,n}^{max,\mu}) - C_{PDCCH}^{CSS,n}$ Set $j = 0$ While $\sum_L M_{S_{USS,n}(j)}^{(L)} \leq M_{PDCCH}^{USS,n}$ AND $C(V_{CCE,n}(S_{USS,n}(j))) \leq C_{PDCCH}^{CSS,n}$ allocate $\sum_L M_{S_{USS,n}(j)}^{(L)}$ PDCCH candidates for monitoring to USS set $S_{USS,n}(j)$ from SSSG $n$;

$M_{PDCCH}^{USS,n} = M_{PDCCH}^{USS,n} - \sum_L M_{S_{USS,n}(j)}^{(L)}$;

$C_{PDCCH}^{USS,n} = C_{PDCCH}^{USS,n} - C(V_{CCE,n}(S_{USS,n}(j)))$;

$j = j + 1$ end while $n = n + 1$ end while

The method 900 as illustrated in FIG. 9 describes first example of UE procedure for search space set partitioning for BD/CCE limit based on a configuration by higher layers.

In step 910, a UE (such as the UE 116) receives a configuration of one or more search space sets for an active DL BWP of a serving cell. In step 920, the UE partitions the one or more search space sets into multiple SSSGs according to configured PDCCH monitoring capability for each search space set. It is noted that all search space sets from a SSSG have a same PDCCH monitoring capability. In step 930, for each SSSG, the UE determines a capability to monitor a maximum number of PDCCH candidates and a maximum number of non-overlapped CCEs based on the PDCCH monitoring capability for the SSSG.

The method 1000 as illustrated in FIG. 10 describes a second example of UE procedure for search space set partitioning for a limit of PDCCH BDs/non-overlapped CCEs based on an adaptation triggered by a DCI format.

In step 1010, a UE (such as the UE 116) receives a configuration of one or more search space sets and one or more combinations of PDCCH monitoring capabilities for an active DL BWP of a scheduled cell. In step, 1020, the UE partitions the one or more search space sets into multiple SSSGs according to configured PDCCH monitoring capability, wherein all search space sets from a SSSG have a same PDCCH monitoring capability. In step 1030, the UE receives a DCI format that includes an indication field with a value providing a combination from the more combinations of PDCCH monitoring capabilities. In step 1040, the UE determines a number of SSSGs, wherein each SSSG from the number of SSSGs is configured with a PDCCH monitoring capability from the indicated combination of PDCCH monitoring capabilities. In step 1050, the UE monitors PDCCH according to the number of SSSGs. In step 1060, for each SSSG from the first number of SSSGs, the UE determines a capability to monitor a maximum number of PDCCH candidates and a maximum number of non-overlapped CCEs for the SSSG based on the PDCCH monitoring capability for the SSCG.

Although FIG. 9 illustrates the method 900 and the FIG. 10 illustrates the method 1000 various changes may be made to FIGS. 9 and 10. For example, while the method 900 and the method 1000 are shown as a series of steps, various steps could overlap, occur in parallel, occur in a different order, or occur multiple times. In another example, steps may be omitted or replaced by other steps. For example, steps of the method 900 and the method 1000 can be executed in a different order.

Embodiments of the present disclosure describe PDCCH skipping related to PRACH transmissions. This is described in the following examples and embodiments, such as those of FIG. 11. That is, embodiments of the disclosure considers a UE operation for transmissions of a PRACH when the UE receives an indication to skip PDCCH monitoring within an active time in RRC_CONNNECTED state. The indication indicates a UE to skip PDCCH monitoring at least in USS or Type3 PDCCH CSS for a time duration in terms of a number of slots.

Figure 11:
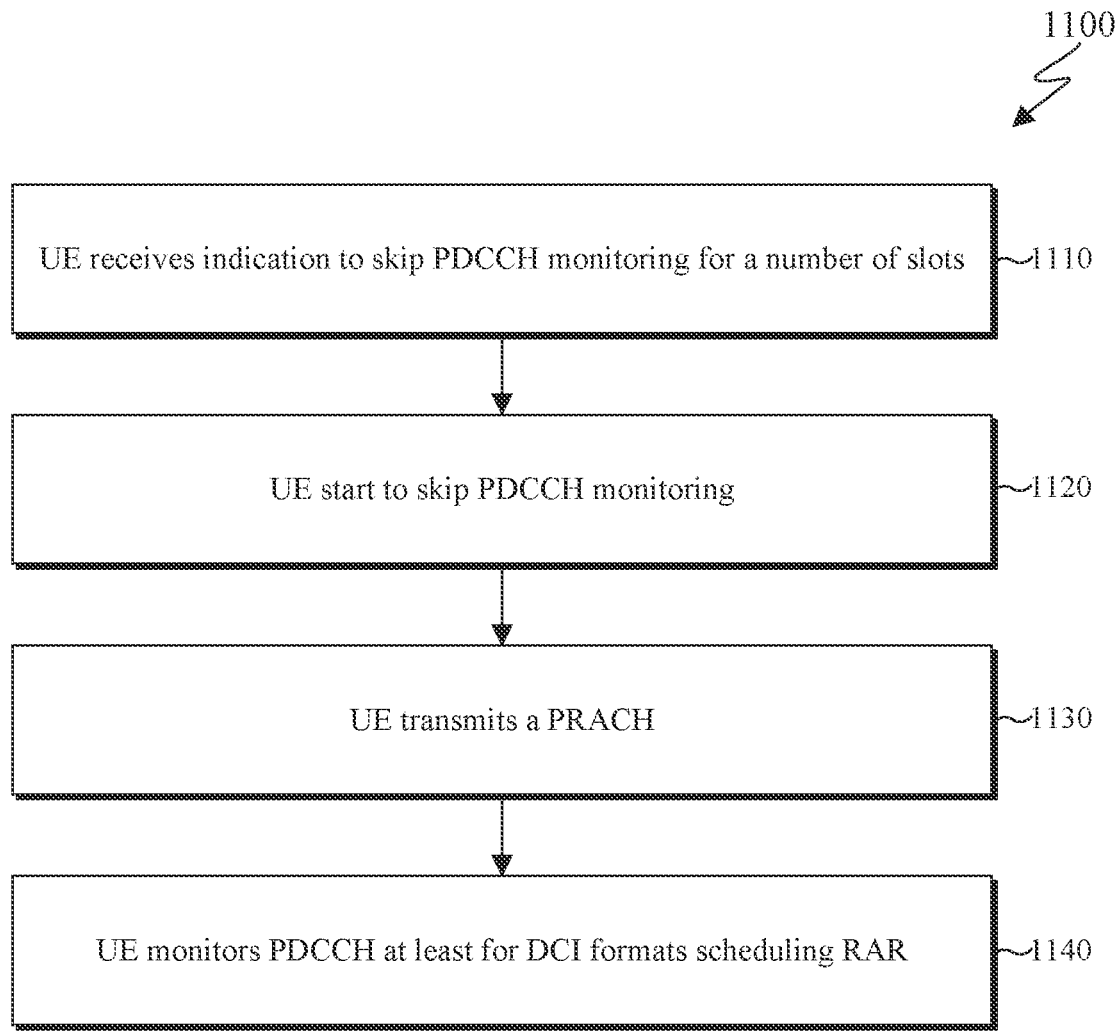
FIG. 11 illustrates an example method for a UE on RACH when the UE was previously indicated to skip PDCCH monitoring for a number of slots within active time in RRC_CONNECTED state according to embodiments of the present disclosure.

FIG. 11 illustrates an example method 1100 for a UE on RACH when the UE was previously indicated to skip PDCCH monitoring for a number of slots within active time in RRC_CONNECTED state according to embodiments of the present disclosure. The steps of the method 1100 of FIG. 11 can be performed by any of the UEs 111-116 of FIG. 1, such as the UE 116 of FIG. 3. The method 1100 is for illustration only and other embodiments can be used without departing from the scope of the present disclosure.

In certain embodiments, for PRACH transmission, a UE can ignore the indication for operation in a power saving mode such as for skipping PDCCH monitoring for a time duration within active time in RRC_CONNECTED state. A UE in the RRC_CONNECTED state can transmit a PRACH for various purposes including re-establishing synchronization with a serving gNB, obtaining a timing advance command from the gNB, indicating link recovery, or indicating new data arrival and then the PRACH transmission also provides the functionality of a positive SR transmission.

The method 1100 as illustrated in FIG. 11 describes an example of a UE procedure on random access channel (RACH) procedure when the UE was previously indicated to skip PDCCH monitoring for a number of slots within active time in RRC_CONNECTED state.

In step 1110, a UE (such as the UE 116) receives an indication to skip PDCCH monitoring for a number of slots, $T_{skip}$, within Active Time in RRC_CONNECTED state. in step 1120, the UE skips PDCCH monitoring from search space sets at least in USS and Type3 PDCCH CSS during start in a slot, $n_{start}$. In step 1130, the UE transmits a PRACH to serving gNB in a slot, n, before end of PDCCH skipping, such that $n < (n_{start} + T_{skip})$. After a PRACH transmission, the UE in step 1140 can start monitoring PDCCH in order to detect a DCI format scheduling a reception of a PDSCH that provides a random access response (RAR) from a serving gNB in response to the PRACH transmission from the UE.

In a first approach for ignoring the indication of PDCCH skipping related to PRACH transmission, after a PRACH transmission, the UE can start monitoring PDCCH in order to detect a DCI format scheduling a reception of a PDSCH that provides a RAR from a serving gNB in response to the PRACH transmission from the UE. After receiving the PDSCH providing the RAR, the UE can switch back to skipping PDCCH monitoring or ignore the indication of PDCCH skipping and continue to monitor PDCCH and then the PRACH transmission overrides the previous indication for skipping PDCCH monitoring.

For link recovery, after a UE transmits a PRACH, the PRACH transmission overrides a previous indication to the UE to skip PDCCH monitoring, and the UE is expected to monitor PDCCH for a DCI format with CRC scrambled by C-RNTI or MCS-C-RNTI at least for a search space set provided by recoverySearchSpaceId as described in REF3.

In second approach for ignoring the indication of PDCCH skipping related to PRACH transmission, a UE assumes the indication of PDCCH skipping within active time is not applicable for a time duration associated with RAR/MsgB reception. The time duration can be RAR/MsgB window as described in REF6.

In third first approach for ignoring the indication of PDCCH skipping related to PRACH transmission, a UE assumes the indication of PDCCH skipping within active time is not applicable to a number of search space sets, wherein at least one of the number of search space sets is used for reception of PDCCH that includes a DCI format scheduling a reception of a PDSCH that provides RAR from a serving gNB in response to a PRACH transmission. In one example, the number of search space sets is provided to the UE by higher layer signaling. In another example, the number of search space sets is predetermined, such as recoverySearchSpaceId as described in REF3. For example, the physical layer signal/channel to indicate the UE to skip PDCCH monitoring can also include an indication for whether or not UE can still transmit a PRACH or whether or not a PRACH transmission overrides the indication for skipping PDCCH monitoring.

In a fourth approach for ignoring the indication of PDCCH skipping related to PRACH transmission, a UE assumes the indication of PDCCH skipping within active time is applicable to a number of search space sets, wherein the number of search space sets are from Type3-CSS or USS. The number of search space sets is provided to the UE by higher layer signaling. For example, the configuration of a search space set for monitoring PDCCH that provides a DCI format indicating whether or not to skip PDCCH monitoring can include an indication for whether or not a PRACH transmission overrides the indication for skipping PDCCH monitoring. For another example, the configuration of PRACH resource can include an indication for whether or not UE can still transmit a PRACH when the UE receives an indication for skipping PDCCH monitoring.

Although FIG. 11 illustrates the method 1100 various changes may be made to FIG. 11. For example, while the method 1100 is shown as a series of steps, various steps could overlap, occur in parallel, occur in a different order, or occur multiple times. In another example, steps may be omitted or replaced by other steps. For example, steps of the method 1100 can be executed in a different order.

Embodiments of the present disclosure describe PDCCH skipping related to scheduling request (SR) transmissions. That is, embodiments of the disclosure considers a UE operation for transmissions of a (positive) SR within an active time in RRC_CONNNECTED state when the UE receives an indication to skip PDCCH monitoring. UE transmits the positive SR via a transmission of a PUCCH or PUSCH. The indication indicates a UE to skip PDCCH monitoring at least in USS or Type3 PDCCH CSS for a time duration in terms of a number of slots.

In certain embodiments, after a UE (such as the EU 116) transmits a positive SR, the SR overrides the indication for skipping PDCCH monitoring at least for DCI formats scheduling a PUSCH transmission. The UE can start monitoring PDCCH at least for DCI formats scheduling a PUSCH transmission in corresponding USS set(s). In another approach, the UE can also monitor PDCCH for DCI formats scheduling a PDSCH reception when the DCI formats have a same size as DCI format scheduling a PUSCH transmission. In another approach, the UE can perform full PDCCH monitoring for all DCI formats after the UE transmits a positive SR. The same can apply when the UE transmits a PRACH serving as a SR. The UE can expect to detect a DCI format, for example DCI format 0_0 or DCI format 0_1 with CRC scrambled by C-RNTI, for scheduling a PUSCH transmission when the positive SR overrides the indication for the UE to skip PDCCH monitoring in a number of slots. The UE can assume the indication for skipping PDCCH monitoring is cancelled or overridden by the positive SR starting from the first symbol or first slot after the transmission of the positive SR.

The UE can determine whether or not the UE can transmit a positive SR when the UE receives an indication for skipping PDCCH monitoring or whether or not a positive SR can override an indication for skipping PDCCH monitoring through any of the following three approaches. In a first approach, whether or not a UE can transmit a positive SR when the UE receives an indication for skipping PDCCH monitoring or whether or not a positive SR can override an indication for skipping PDCCH monitoring can be defined in the specification of the system operation. For example, it can be specified by the system operation that a UE can transmit a positive SR when the UE receives an indication for skipping PDCCH monitoring, and a positive SR can override an indication for skipping PDCCH monitoring, and UE can starts monitoring PDCCH after transmitting a SR.

In a second approach, whether or not a UE can transmit a positive SR when the UE receives an indication for skipping PDCCH monitoring or whether or not a positive SR can override an indication for skipping PDCCH monitoring can be provided to the UE through higher layer signaling. For example, the configuration of a search space set for monitoring PDCCH that provides a DCI format indicating whether or not to skip PDCCH monitoring can include an indication for whether or not a positive SR transmission overrides the indication for skipping PDCCH monitoring. For another example, the configuration of PUCCH resource for SR transmission can include an indication for whether or not UE can still transmit a positive SR when the UE receives an indication for skipping PDCCH monitoring.

In a third approach, the physical layer signal/channel to indicate the UE to skip PDCCH monitoring can also include an indication for whether or not UE can still transmit a positive SR or whether or not a positive SR transmission overrides the indication for skipping PDCCH monitoring.

Embodiments of the present disclosure describe an overbooking procedure for idle/inactive mode UEs configured for SDT for MBS. This is described in the following examples and embodiments, such as those of FIGS. 12-16. That is, embodiments of the disclosure considers a PDCCH overbooking procedure for a UE in an RRC_IDLE/INACTIVE state that is configured for small data transmission (SDT) or for multicast or broadcast services (MBS). When the UE is not configured for one of SDT or MBS, for the purposes of the following descriptions, a corresponding number of search space sets or of PDCCH candidates can be assumed to be zero.

FIG. 12-16 illustrate example methods 1200-1600, respectively, for a UE in RRC_IDLE/INACTIVE state to resolve PDCCH overbooking according to embodiments of the present disclosure. The steps of the method 1200 of FIG. 12, the method 1300 of FIG. 13, the method 1400 of FIG. 14, the method 1500 of FIG. 15, and the method 1600 of FIG. 16 can be performed by any of the UEs 111-116 of FIG. 1, such as the UE 116 of FIG. 3. The methods 1200-1600 are for illustration only and other embodiments can be used without departing from the scope of the present disclosure.

In certain embodiments, for a UE (such as the UE 116) in RRC_IDLE/INACTIVE state, the UE can be configured to monitor a first set of PDCCH candidates according to CSS sets in an active DL BWP, such as an initial DL BWP. Here the first set of PDCCH candidates includes any of the following. For example, the first set of PDCCH candidates can include a Type0-PDCCH or Type0A-PDCCH for detection of a DCI format 1_0 with CRC bits scrambled by SI-RNTI scheduling a PDSCH that provides system information. For another example, the first set of PDCCH candidates can include a Type1-PDCCH for detection of a DCI format 1_0 with CRC bits scrambled by RA-RNTI or MsgB-RNTI or Temporary C-RNTI scheduling a PDSCH that provides random access response (RAR) messages or a UE contention resolution identity. For another example, the first set of PDCCH candidates can include a Type2-PDCCH for detection of a DCI format 1_0 with CRC bits scrambled by P-RNTI that includes a short message and/or schedules a PDSCH reception that provides a paging message. For yet another example, the first set of PDCCH candidates can include a Type1-PDCCH for detection of a DCI format 0_0 with CRC bits scrambled by TC-RNTI scheduling a PUSCH transmission that provides a msg3 PUSCH as part of a random access procedure.

In certain embodiments, for a UE (such as the UE 116) in RRC_IDLE/INACTIVE state that has successfully completed a RA procedure to resolve contention, the UE remains in inactive state without establishing RRC connection. The UE can be further configured to monitor a second set of PDCCH candidates for scheduling SDT in an active DL BWP. Here, the second set of PDCCH candidates includes: (i) PDCCH for detection of a DCI format with CRC scrambled by C-RNTI scheduling a PDSCH reception, or (ii) PDCCH for detection of a DCI format with CRC scrambled by C-RNTI scheduling a PUSCH transmission.

A UE (such as the UE 116) can receive PDCCH candidates from the second set for scheduling SDT according to one or more CSS sets. In one example, the UE determines a CSS set based on any CSS set that the UE uses for receptions of the first set of PDCCH candidates, for example a Type0-PDCCH CSS set. In another example, the UE determines a CSS set based on a separate configuration provided by a SIB, or by a Msg2/Msg4/MsgB of an RA procedure, or by a RRC release message. Alternatively, the UE can receive PDCCH candidates from the second set for scheduling SDT according to a USS set. In one example, the UE can determine the USS set for SDT based on a configuration provided by a RRC release message. In another example, the UE can determine a USS set for SDT based on a configuration provided in Msg2/Msg4/MsgB of an RA procedure.

A DCI format with CRC scrambled by C-RNTI that schedules a PUSCH transmission for SDT can be a DCI format 0_0 or a DCI format 0_1 or a DCI format 0_2 as described in REF2, possibly with modification of some fields to re-purpose for SDT PUSCH transmission while keeping a same DCI format size. Alternatively, a new DCI format can be defined for scheduling a PUSCH transmission for SDT. Similar, a DCI format with CRC scrambled by C-RNTI that schedules a PDSCH reception for SDT can be a DCI format 1_0 or a DCI format 1_1 or a DCI format 1_2 as described in REF2, possibly with modification of some fields to re-purpose for SDT PDSCH reception while keeping a same DCI format size. Alternatively, a new DCI format can be defined for scheduling a PDSCH reception for SDT.

A PDCCH that includes a DCI format with CRC scrambled by C-RNTI and schedules a PDSCH reception or PUSCH transmission for SDT is referred as TypeS-PDCCH in this disclosure.

For a UE in RRC_IDLE/INACTIVE state that has successfully completed a RA procedure to resolve contention, the UE remains in inactive state without establishing an RRC connection. The UE can be additionally configured to monitor a third set of PDCCH candidates for detection of one or more DCI formats with CRC scrambled by one or more G-RNTIs that schedule respective one or more PDSCH receptions for MBS traffic. The UE can monitor the third set of PDCCH candidates according to one or more CSS sets. For example, the CSS sets can be configured to the UE by a SIB or a RRC release message and can also correspond to a new Type of CSS sets that is referred to as Type-4 PDCCH CSS sets.

A DCI format with CRC scrambled by G-RNTI to schedule a PDSCH for MBS can be either an existing DCI format, with possible modifications for some of its fields, such as a DCI format 1_0 or a DCI format 1_2, or a new DCI format that is used specifically for MBS, and may be further applicable only for UEs in RRC_IDLE/INACTIVE state, such as a DCI format 1_M.

When a UE (such as the UE 116) in RRC_IDLE/INACTIVE state is configured to monitor PDCCH based on a number of search space sets, the UE can determine a PDCCH monitoring capability in terms of a maximum number of $M_{PDCC}^{max,slot,\mu}$ PDCCH candidates and a maximum number of $C_{PDCC}^{max,slot,\mu}$ non-overlapped CCEs per slot with SCS configuration μ. The number of search space sets can be partitioned into three SSSGs. A first SSSG, denoted as $S_{CSS,0}$, includes CSS sets that are configured with PDCCH candidates from the first set of PDCCH candidates. A second SSSG, denoted as $S_{CSS,1}$ or $S_{USS,1}$, includes CSS sets or USS sets that are configured with TypeS-PDCCH candidates. A third SSSG, denoted as $S_{CSS,2}$, includes CSS sets that are configured with TypeM-PDCCH candidates.

In certain embodiments, there may also be an overlapping among the three SSSGs. For example, when a search space set is configured to include TypeS-PDCCH candidates and TypeM-PDCCH candidates, for detection of corresponding DCI formats for SDT and MBS, the search space set can be counted in both $S_{CSS,1}$ and $S_{CSS,2}$.

For CSS sets from $S_{CSS,0}$ where a UE is configured or indicated to monitor the first set of PDCCH candidates within a slot, denote a cardinality of $S_{CSS,0}$ by $i_{CSS,0}$, and denote by $M_{S_{CSS,0}(i)}^{(L)}$, $0 \le i < I_{CSS,0}$, a number of counted PDCCH candidates that belong to the first set of PDCCH candidates for monitoring according to a CSS set, $S_{CSS,0}(i)$ from $S_{CSS,0}$. The UE monitors a number of $M_{PDCCH}^{CSS,0} = \sum_{i=0}^{I_{CSS,0}} \sum_L M_{S_{CSS,0}(i)}^{(L)}$ candidates from the first set requiring a total of $C_{PDCCH}^{CSS,0}$ non-overlapping CCEs in a slot.

In a first approach for a procedure to resolve PDCCH overbooking in a slot for a UE in RRC_IDLE/INACTIVE state that is configured for scheduling of SDT and MBS, the UE prioritizes reception of PDCCH candidates from a CSS set for scheduling SDT over PDCCH candidates from a CSS set for scheduling MBS.

For example, for TypeS-PDCCH candidates in CSS sets, denote a cardinality of $S_{CSS,1}$ by $I_{CSS,1}$, and denote by $M_{S_{CSS,1}(i)}^{(L)}$, $0 \le i < I_{CSS,1}$, a number of counted TypeS-PDCCH candidates for monitoring according to a CSS set, $S_{CSS,1}(i)$ from $S_{CSS,1}$ within a slot. Denote by $V_{CCE,1}(S_{CSS,1}(i))$ the set of non-overlapping CCEs for search space set $S_{CSS,1}(i)$ from $S_{CSS,1}$ and by $\mathcal{C}(V_{CCE,1}(S_{CSS,1}(i)))$ the cardinality of $V_{CCE,1}(S_{CSS,1}(i))$.

Denote a cardinality of $S_{CSS,2}$ by $I_{CSS,2}$, and denote by $M_{S_{CSS,2}(i)}^{(L)}$; $0 \le i < I_{CSS,2}$, a number of counted TypeM-PDCCH candidates for monitoring according to a CSS set, $S_{CSS,2}(i)$ from $S_{CSS,2}$ within a slot. Denote by $V_{CCE,2}(S_{CSS,2}(i))$ the set of non-overlapping CCEs for search space set $S_{CSS,2}(i)$ from $S_{CSS,2}$ and by $\mathcal{C}(V_{CCE,2}(S_{CSS,2}(i)))$ the cardinality of $V_{CCE,2}(S_{CSS,2}(i))$.

The location of CSS set $S_{CSS,n}(i)$, $0 \le i < i_{CSS,n}$, in $S_{CSS,n}$ is according to an ascending order of the search space set index.

In certain embodiments, a UE (such as the UE 116) allocates PDCCH candidates for scheduling SDT and MBS within a slot as described in Syntax (2), below:

Syntax (2)

Set $n = 1$

Set $M_{PDCCH}^{slot,\mu} = M_{PDCCH}^{max,slot,\mu} - M_{PDCCH}^{CSS,0}$

Set $C_{PDCCH}^{slot,\mu} = C_{PDCCH}^{max,slot,\mu} - C_{PDCCH}^{CSS,0}$ while $n < 3$ Set $i = 0$ While $\sum_L M_{S_{CSS,n}(i)}^{(L)} \le M_{PDCCH}^{slot,n}$ AND $\mathcal{C}(V_{CCE,n}(S_{USS,n}(i))) \le C_{PDCCH}^{slot,n}$ If $n == 1$, allocate $\sum_L M_{S_{CSS,1}(i)}^{(L)}$ Type$S$–PDCCH candidates for monitoring to CSS set $S_{CSS,1}(i)$ from $S_{CSS,1}$;

else, allocate $\sum_L M_{S_{CSS,2}(i)}^{(L)}$ Type$M$–PDCCH candidates for monitoring to CSS set $S_{CSS,2}(i)$ from $S_{CSS,2}$;

end if $M_{PDCCH}^{slot,\mu} = M_{PDCCH}^{slot,\mu} - \sum_L M_{S_{CSS,n}(i)}^{(L)}$;

$C_{PDCCH}^{slot,\mu} = C_{PDCCH}^{slot,\mu} - \mathcal{C}(V_{CCE,n}(S_{CSS,n}(i)))$;

$i = i + 1$ end while $n = n + 1$ end while

Figure 12:
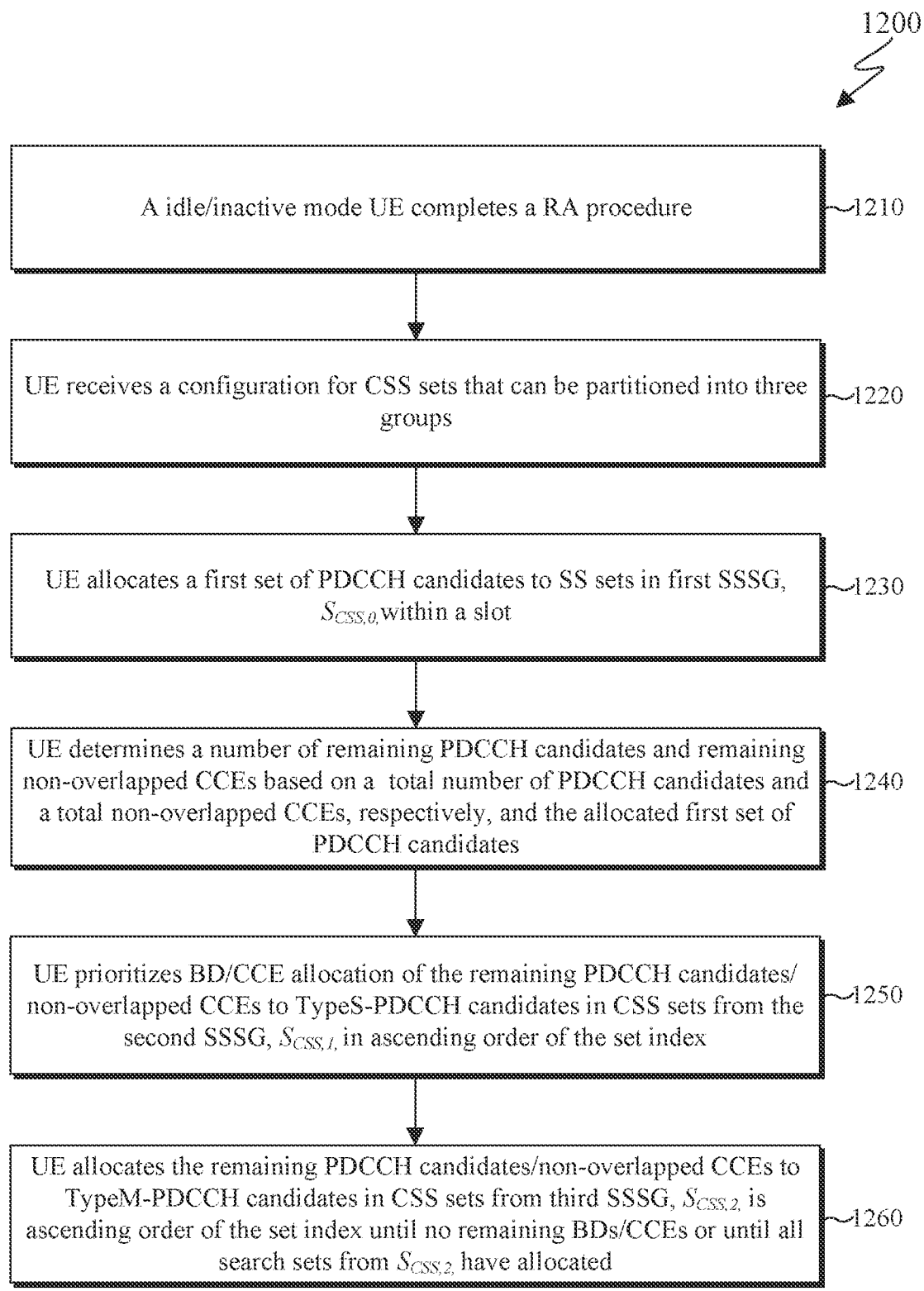
FIG. 12-16 illustrate example methods for a UE in RRC_IDLE/INACTIVE state to resolve PDCCH overbooking according to embodiments of the present disclosure.

The method 1200 as illustrated in FIG. 12 describes a first example of a procedure for a UE in RRC_IDLE/INACTIVE state to resolve PDCCH overbooking according to the disclosure.

In step 1210, a UE (such as the UE 116) in an RRC_IDLE/INACTIVE state completes a RA procedure on a serving cell. In step 1220, the UE receives a configuration for a number of CSS sets for PDCCH monitoring, wherein the number of CSS sets can be partitioned into three SSSGs. A first SSSG, $S_{CSS,0}$, includes CSS sets configured with a first set of PDCCH candidates, a second SSSG, $S_{CSS,1}$, includes CSS sets configured with TypeS-PDCCH candidates, and a third SSSG, $S_{CSS,2}$, includes CSS sets configured with TypeM-PDCCH candidates.

In step 1230, the UE allocates a first set of configured PDCCH candidates to CSS sets in the first SSSG, $S_{CSS,0}$, within a slot. In step 1240, the UE determines a number of $M_{PDCCH}^{slot,\mu}$ remaining PDCCH candidates and a number of $C_{PDCCH}^{slot,\mu}$ non-overlapped CCEs within the slot based on a total number of PDCCH candidates and a total non-overlapped CCEs, respectively, per slot on the serving cell and the allocated first set of PDCCH candidates to CSS sets in the first SSSG, $S_{CSS,0}$. In step 1250, the UE prioritizes allocation of the remaining PDCCH candidates/non-overlapped CCEs to TypeS-PDCCH candidates and corresponding non-overlapped CCEs in CSS sets from the second SSSG, $S_{CSS,1}$, in ascending order of search space set index. In step 1260, the UE allocates to TypeM-PDCCH candidates in CSS sets from the third SSSG, $S_{CSS,2}$, in ascending order of search space set index, until no PDCCH candidates or non-overlapped CCEs remain or until all search space sets from $S_{CSS,1}$ or $S_{CSS,2}$ have allocated PDCCH candidates.

In a second approach for a procedure to resolve PDCCH overbooking for a UE in RRC_IDLE/INACTIVE state that is configured for SDT and for MBS, the UE prioritizes allocation of PDCCH monitoring capability to PDCCH candidates of USS sets associated with DCI formats for scheduling SDT over PDCCH candidates in CSS sets associated with DCI formats for scheduling MBS.

For example, for TypeS-PDCCH candidates in USS sets, denote a cardinality of $S_{USS,1}$ by $I_{USS,1}$, and denote by $M_{S_{USS,1}(i)}^{(L)}$, $0 \le i < I_{USS,1}$, a number of counted TypeS-PDCCH candidates for monitoring according to a USS set, $S_{USS,1}(i)$, from $S_{USS,1}$ within a slot. Denote by $V_{CCE,1}(S_{USS,1}(i))$ the set of non-overlapping CCEs for search space set $S_{USS,1}(i)$ from $S_{USS,1}$ and by $\mathcal{C}(V_{CCE,1}(S_{USS,1}(i)))$ the cardinality of $V_{CCE,1}(S_{USS,1}(i))$. The location of USS set $S_{USS,1}(i)$, $0 \le i < I_{USS,1}$, in $S_{USS,1}(i)$ is according to an ascending order of the search space set index.

Denote a cardinality of $S_{CSS,2}$ by $I_{CSS,2}$, and denote by $M_{S_{CSS,2}(i)}^{(L)}$, $0 \le i < I_{CSS,2}$, a number of counted TypeM-PDCCH candidates for monitoring according to a CSS set, $S_{CSS,2}(i)$, from $S_{CSS,2}$ within a slot. Denote by $V_{CCE,2}(S_{CSS,2}(i))$ the set of non-overlapping CCEs for search space set $S_{CSS,2}(i)$ from $S_{CSS,2}$ and by $\mathcal{C}(V_{CCE,2}(V_{CSS,2}(i)))$ the cardinality of $V_{CCE,2}(S_{CSS,2}(i))$. The location of CSS set $S_{CSS,2}(i)$, $0 \le i < I_{CSS,2}$, in $S_{CSS,2}$ is according to an ascending order of the search space set index.

In certain embodiments, a UE (such as the UE 116) allocates PDCCH candidates for scheduling SDT and MBS within a slot s described in Syntax (3), below:

Syntax (3)

Set $n = 1$

Set $M_{PDCCH}^{slot,\mu} = M_{PDCCH}^{max,slot,\mu} - M_{PDCCH}^{CSS,0}$

Set $C_{PDCCH}^{slot,\mu} = C_{PDCCH}^{max,slot,\mu} - C_{PDCCH}^{CSS,0}$ while $n < 3$ Set $i = 0$ While $\sum_L M_{S_{CSS,n}(i)}^{(L)} \le M_{PDCCH}^{slot,\mu}$ AND $\mathcal{C}(V_{CCE,n}(S_{CSS,n}(i))) \le C_{PDCCH}^{slot,\mu}$ If $n == 1$, allocate $\sum_L M_{S_{USS,1}(i)}^{(L)}$ Type$S$–PDCCH candidates for monitoring to USS set $S_{USS,1}(i)$ from $S_{USS,1}$;

$M_{PDCCH}^{slot,\mu} = M_{PDCCH}^{slot,\mu} - \sum_L M_{S_{CSS,1}(i)}^{(L)}$;

-continued $C_{PDCCH}^{slot,\mu} = C_{PDCCH}^{slot,\mu} - \mathcal{C}(V_{CCE,n}(S_{USS,1}(i)))$;

else, allocate $\sum_L M_{S_{CSS,2}(i)}^{(L)}$ TypeM−PDCCH candicates for monitoring to CSS set $S_{CSS,2}(i)$ from $S_{CSS,2}$;

$M_{PDCCH}^{slot,\mu} = M_{PDCCH}^{slot,\mu} - \sum_L M_{S_{CSS,2}(i)}^{(L)}$;

$C_{PDCCH}^{slot,\mu} = C_{PDCCH}^{slot,\mu} - \mathcal{C}(V_{CCE,2}(S_{CSS,2}(i)))$;

$i = i + 1$ end while $n = n + 1$ end while

The method 1300 as illustrated in FIG. 5 describes a second example of a procedure for a UE in RRC_IDLE/INACTIVE state to resolve PDCCH overbooking according to the disclosure.

In step 1310, a UE (such as the UE 116) in RRC_IDLE/INACTIVE state completes a RA procedure on a serving cell. In step 1320, the UE receives a configuration for a number of search space sets for PDCCH monitoring, wherein the number of search space sets can be partitioned into three SSSGs. A first SSSG, $S_{CSS,0}$, includes CSS sets configured with a first set of PDCCH candidates, a second SSSG, $S_{USS,1}$, includes a UE-specific search space (USS) sets configured with TypeS-PDCCH candidates, and a third SSSG, $S_{CSS,2}$, includes CSS sets configured with TypeM-PDCCH candidates.

In step 1330, the UE allocates a first set of configured PDCCH candidates to CSS sets in the first SSSG, $S_{CSS,0}$, within a slot. In step 1340, the UE determines a number of $M_{PDCCH}^{slot,\mu}$ remaining PDCCH candidates and a number of $C_{PDCCH}^{slot,\mu}$ non-overlapped CCEs within the slot based on a total number of PDCCH candidates and a total non-overlapped CCEs, respectively, per slot on the serving cell and the allocated first set of PDCCH candidates to CSS sets in the first SSSG, $S_{CSS,0}$. In step 1350, the UE prioritizes allocation of the remaining PDCCH candidates/non-overlapped CCEs to TypeS-PDCCH candidates and corresponding non-overlapped CCEs in USS sets from the second SSSG, $S_{USS,1}$, in ascending order of search space set index. In step 1360 the UE allocates to TypeM-PDCCH candidates in CSS sets from the third SSSG, $S_{CSS,2}$, in ascending order of search space set index, until there are no PDCCH candidates or non-overlapping CCEs remain or until all search space sets from $S_{CSS,1}$ or $S_{CSS,2}$ have allocated PDCCH candidates.

In a third approach for a procedure to resolve PDCCH overbooking for a UE in RRC_IDLE/INACTIVE state that is configured for SDT and for MBS, the UE prioritizes allocation of PDCCH monitoring capability to PDCCH candidates in CSS sets associated with DCI formats for scheduling MBS over PDCCH candidates in CSS sets or USS sets associated with DCI formats for scheduling SDT.

For example, for TypeS-PDCCH candidates in CSS sets, denote a cardinality of $S_{CSS,1}$ by $I_{CSS,1}$, and denote by $M_{S_{CSS,1}(i)}^{(L)}$, $0 \leq i < I_{CSS,1}$, a number of counted TypeS-PDCCH candidates for monitoring PDCCH according to a CSS set, $S_{CSS,1}(i)$, from $S_{CSS,1}$ within a slot. Denote by $V_{CCE,1}(S_{CSS,1}(i))$ the set of non-overlapping CCEs for search space set $S_{CSS,1}(i)$ from $S_{CSS,1}$ and by $\mathcal{C}(V_{CCE,1}(S_{CSS,1}(i)))$ the cardinality of $V_{CCE,1}(S_{CSS,1}(i))$.

Denote a cardinality of $S_{CSS,2}$ by $I_{CSS,2}$, and denote by $M_{S_{CSS,2}(i)}^{(L)}$, $0 \leq i < I_{CSS,2}$, a number of counted TypeM-PDCCH candidates for monitoring according to a CSS set, $S_{CSS,2}(i)$, from $S_{CSS,2}$ within a slot. Denote by $V_{CCE,2}(S_{CSS,2}(i))$ the set of non-overlapping CCEs for search space set $S_{CSS,2}(i)$ from $S_{CSS,2}$ and by $\mathcal{C}(V_{CCE,2}(S_{CSS,2}(i)))$ the cardinality of $V_{CCE,2}(S_{CSS,2}(i))$.

The location of CSS set $S_{CSS,n}$, $0 \leq i < I_{CSS,n}$, in $S_{CSS,n}$ is according to an ascending order of the search space set index.

In certain embodiments, a UE (such as the UE 116) allocates PDCCH candidates for scheduling SDT and MBS within a slot s described in Syntax (4), below:

Syntax (4)

Set $n = 2$

Set $M_{PDCCH}^{slot,\mu} = M_{PDCCH}^{max,slot,\mu} - M_{PDCCH}^{CSS,0}$

Set $C_{PDCCH}^{slot,\mu} = C_{PDCCH}^{max,slot,\mu} - C_{PDCCH}^{CSS,0}$ while $n > 0$ Set $i = 0$ While $\sum_L M_{S_{CSS,n}(i)}^{(L)} \leq M_{PDCCH}^{slot,\mu}$ AND $\mathcal{C}(V_{CCE,n}(S_{CSS,n}(i))) \leq C_{PDCCH}^{slot,\mu}$ If $n == 1$, allocate $\sum_L M_{S_{CSS,1}(i)}^{(L)}$ TypeS−PDCCH candicates for monitoring to CSS set $S_{CSS,1}(i)$ from $S_{CSS,1}$;

else, allocate $\sum_L M_{S_{CSS,2}(i)}^{(L)}$ TypeM−PDCCH candicates for end if $M_{PDCCH}^{slot,\mu} = M_{PDCCH}^{slot,\mu} - \sum_L M_{S_{CSS,n}(i)}^{(L)}$;

$C_{PDCCH}^{slot,\mu} = C_{PDCCH}^{slot,\mu} - \mathcal{C}(V_{CCE,n}(S_{CSS,n}(i)))$;

$i = i + 1$ end while $n = n + 1$ end while

Figure 14:
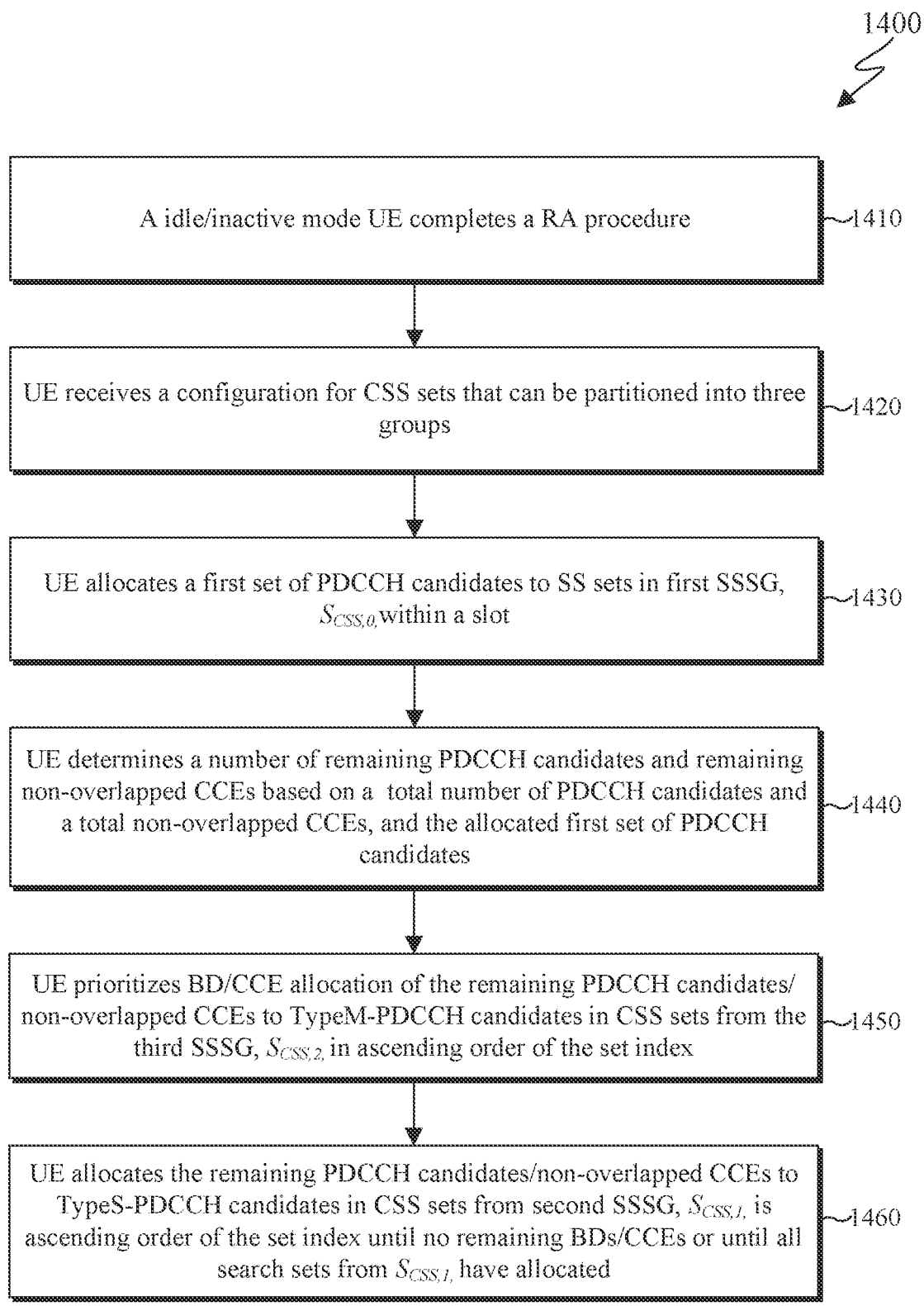

The method 1400 as illustrated in FIG. 14 describes a third example of a procedure for a UE in RRC_IDLE/INACTIVE state procedure to resolve PDCCH overbooking according to the disclosure.

In step 1410, a UE (such as the UE 116) in an RRC_IDLE/INACTIVE state completes a RA procedure on a serving cell. in step 1420, the UE receives a configuration for a number of CSS sets for PDCCH monitoring, wherein the number of CSS sets can be partitioned into three SSSGs. A first SSSG, $S_{CSS,0}$, includes CSS sets configured with a first set of PDCCH candidates, a second SSSG, $S_{CSS,1}$, includes CSS sets configured with TypeS-PDCCH candidates, and a third SSSG, $S_{CSS,2}$, includes CSS sets configured with TypeM-PDCCH candidates.

In step 1430, the UE allocates a first set of configured PDCCH candidates to CSS sets in the first SSSG, $S_{CSS,0}$, within a slot. In step 1440, the UE determines a number of $M_{PDCCH}^{slot,\mu}$ remaining PDCCH candidates and a number of $C_{PDCCH}^{slot,\mu}$ non-overlapped CCEs within the slot based on a total number of PDCCH candidates and a total non-overlapped CCEs, respectively, per slot on the serving cell and the allocated first set of PDCCH candidates to CSS sets in the first SSSG, $S_{CSS,0}$ In step 1450, the UE prioritizes allocation of the remaining PDCCH candidates/non-overlapped CCEs to TypeM-PDCCH candidates and corresponding non-overlapped CCEs in CSS sets from the third SSSG, $S_{CSS,2}$, in ascending order of search space set index. In step 1460, the UE allocates to TypeS-PDCCH candidates in CSS sets from the second SSSG, $S_{CSS,1}$, in ascending order of search space set index, until no PDCCH candidates or non-overlapped CCEs remain or until all search space sets from $S_{CSS,2}$ and $S_{CSS,1}$ have PDCCH candidates allocated.

In a fourth approach for a procedure to resolve PDCCH overbooking for a UE in RRC_IDLE/INACTIVE state that is configured for SDT and for MBS, the UE prioritizes allocation of PDCCH monitoring capability to PDCCH candidates in CSS sets associated with DCI formats for scheduling MBS over PDCCH candidates in USS sets associated with DCI formats for scheduling SDT.

For example, for TypeS-PDCCH candidates in USS sets, denote a cardinality of $S_{USS,1}$ by $I_{USS,1}$, and denote by $M_{S_{USS,1}(i)}^{(L)}$, $0 \leq i < I_{USS,1}$, a number of counted TypeS-PDCCH candidates for monitoring according to a USS set, $S_{USS,1}(i)$ from $S_{USS,1}$ within a slot. Denote by $V_{CCE,1}(S_{USS,1}(i))$ the set of non-overlapping CCEs for search space set $S_{USS,1}(i)$ from $S_{USS,1}$ and by $C(V_{CCE,1}(S_{USS,1}(i)))$ the cardinality of $V_{CCE,1}(S_{USS,1}(i))$. The location of USS set $S_{USS,1}(i)$ $0 \leq i < I_{USS,1}$, in $S_{USS,1}(i)$ is according to an ascending order of the search space set index.

Denote a cardinality of $S_{CSS,2}$ by $I_{CSS,2}$, and denote by $M_{S_{CSS,2}(i)}^{(L)}$, $0 \leq i < I_{CSS,2}$, a number of counted TypeM-PDCCH candidates for monitoring according to a CSS set, $S_{CSS,2}(i)$, from $S_{CSS,2}$ within a slot. Denote by $V_{CCE,2}(S_{CSS,2}(i))$ the set of non-overlapping CCEs for search space set $S_{CSS,2}(i)$ from $S_{CSS,2}$ and by $C(V_{CCE,2}(S_{CSS,2}(i)))$ the cardinality of $V_{CCE,2}(S_{CSS,2}(i))$. The location of CSS set $S_{CSS,2}(i)$, $0 \leq i < I_{CSS,2}$, in $S_{CSS,2}$ is according to an ascending order of the search space set index.

In certain embodiments, a UE (such as the UE 116) allocates PDCCH candidates for scheduling SDT and MBS within a slot as described in Syntax (5), below.

Syntax

Set $n = 2$

Set $M_{PDCCH}^{slot,\mu} = M_{PDCCH}^{max,slot,\mu} - M_{PDCCH}^{CSS,0}$

Set $C_{PDCCH}^{slot,\mu} = C_{PDCCH}^{max,slot,\mu} - C_{PDCCH}^{CSS,0}$ while $n > 0$ Set $i = 0$ While $\sum_L M_{S_{CSS,n}(i)}^{(L)} \leq M_{PDCCH}^{slot,\mu}$ AND $C(V_{CCE,n}(S_{CSS,n}(i))) \leq C_{PDCCH}^{slot,\mu}$ If $n == 1$, allocate $\sum_L M_{S_{USS,1}(i)}^{(L)}$ TypeS–PDCCH candidates for monitoring to USS set $S_{USS,1}(i)$ from $S_{USS,1}$;

$M_{PDCCH}^{slot,\mu} = M_{PDCCH}^{slot,\mu} - \sum_L M_{S_{USS,n}(i)}^{(L)}$;

$C_{PDCCH}^{slot,\mu} = C_{PDCCH}^{slot,\mu} - C(V_{CCE,n}(S_{USS,1}(i)))$;

else, allocate $\sum_L M_{S_{CSS,2}(i)}^{(L)}$ TypeM–PDCCH candicates for

-continued monitoring to CSS set $S_{CSS,2}(i)$ from $S_{CSS,2}$;

$M_{PDCCH}^{slot,\mu} = M_{PDCCH}^{slot,\mu} - \sum_L M_{S_{CSS,2}(i)}^{(L)}$;

$C_{PDCCH}^{slot,\mu} = C_{PDCCH}^{slot,\mu} - C(V_{CCE,2}(S_{CSS,2}(i)))$;

$i = i + 1$ end while $n = n + 1$ end while

Figure 15:
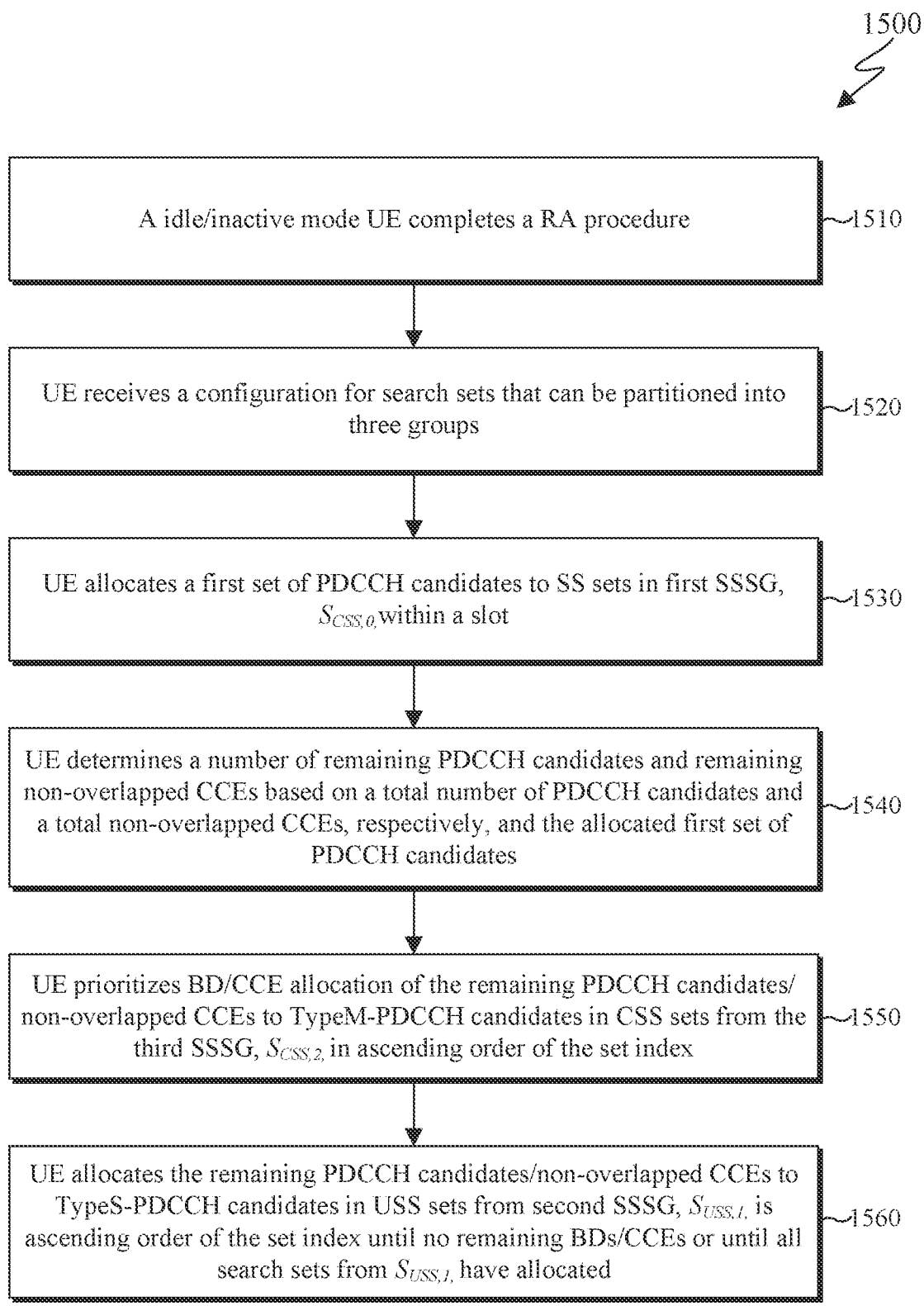

The method 1500 as illustrated in FIG. 15 describes a fourth example of a procedure for a UE in RRC_IDLE/INACTIVE state to resolve PDCCH overbooking according to the disclosure.

In step 1510, a UE (such as the UE 116) in an RRC_IDLE/INACTIVE state completes a RA procedure on a serving cell. in step 1520, the UE receives a configuration for a number of search space sets for PDCCH monitoring for the serving cell, wherein the number of search space sets can be partitioned into three SSSGs. A first SSSG, $S_{CSS,0}$, includes CSS sets configured with a first set of PDCCH candidates, a second SSSG, $S_{USS,1}$, includes USS sets configured with TypeS-PDCCH candidates, and a third SSSG, $S_{CSS,2}$, includes CSS sets configured with TypeM-PDCCH candidates.

In step 1530, the UE allocates a first set of configured PDCCH candidates to CSS sets in the first SSSG, $S_{CSS,0}$, within a slot. In step 1540, the UE determines a number of $M_{PDCCH}^{slot,\mu}$ remaining PDCCH candidates and a number of $C_{PDCCH}^{slot,\mu}$ non-overlapped CCEs within the slot based on a total number of PDCCH candidates and a total non-overlapped CCEs, respectively, per slot on the serving cell and the allocated first set of PDCCH candidates and non-overlapped CCEs to CSS sets in the first SSSG, $S_{CSS,0}$. In step 1550, the UE prioritizes allocation of the remaining PDCCH candidates/non-overlapped CCEs to TypeM-PDCCH candidates and corresponding non-overlapped CCEs in CSS sets from the third SSSG, $S_{CSS,2}$, in ascending order of search space set index. In step 1560, the UE allocates to TypeS-PDCCH candidates in USS sets from the second SSSG, $S_{USS,1}$, in ascending order of search space set index, until no PDCCH candidates or non-overlapped CCEs remain or until all search space sets from $S_{CSS,2}$ and $S_{USS,1}$ have PDCCH candidates allocated.

In a fifth approach for a procedure to resolve PDCCH overbooking for a UE in RRC_IDLE/INACTIVE state that is configured for SDT and for MBS, the UE prioritizes allocation of a PDCCH monitoring capability to PDCCH candidates associated with DCI formats for scheduling MBS or associated with DCI formats for scheduling SDT in search space sets according to a search space set index.

For example, the second and third SSSGs can be considered as a single SSSG, $S_{SS,1}$, that includes search space sets configured with TypeS-PDCCH candidates or TypeM-PDCCH candidates. The search space sets in $S_{SS,1}$ can be CSS sets or USS sets. Therefore, a number of configured search space sets are partitioned into two SSSGs, $S_{CSS,0}$, and $S_{SS,1}$, respectively. Denote a cardinality of $S_{SS,1}$ by $I_{SS,1}$, and denote by $M_{S_{SS,1}(i)}^{(L)}$, $0 \leq i < I_{SS,1}$, a number of counted TypeS-PDCCH or TypeM-PDCCH candidates for monitoring PDCCH according to a search space set, $S_{SS,1}(i)$ from $S_{SS,1}$ within a slot. Denote by $V_{CCE,1}(S_{SS,1}(i))$ the set of non-overlapping CCEs for search space set $S_{SS,1}(i)$ from $S_{SS,1}$ and by $\mathcal{C}(V_{CCE,1}(S_{SS,1}(i)))$ the cardinality of $V_{CCE,1}(S_{SS,1}(i))$. The location of CSS set $S_{SS,1}(i)$, $0 \le i < I_{SS,1}$, in $S_{SS,1}$ is according to an ascending order of the search space set index.

In certain embodiments, a UE (such as the UE 116) allocates PDCCH candidates for scheduling SDT and MBS within a slot as described in Syntax (6), below.

Syntax (6)

Set $M_{PDCCH}^{slot,\mu} = M_{PDCCH}^{max,slot,\mu} - M_{PDCCH}^{CSS,0}$

Set $C_{PDCCH}^{slot,\mu} = C_{PDCCH}^{max,slot,\mu} - C_{PDCCH}^{CSS,0}$

Set $i = 0$

While $\sum_L M_{S_{SS,1}(i)}^{(L)} \le M_{PDCCH}^{slot,\mu}$ AND $\mathcal{C}(V_{CCE,1}(S_{SS,1}(i))) \le C_{PDCCH}^{slot,\mu}$ allocate $\sum_L M_{S_{SS,1}(i)}^{(L)}$ TypeS-PDCCH or TypeM-PDCCH candidates for monitoring to search space set $S_{SS,1}(i)$ from $S_{SS,1}$;

$M_{PDCCH}^{slot,\mu} = M_{PDCCH}^{slot,\mu} - \sum_L M_{S_{SS,1}(i)}^{(L)}$;

$C_{PDCCH}^{slot,\mu} = C_{PDCCH}^{slot,\mu} - \mathcal{C}(V_{CCE,1}(S_{SS,1}(i)))$;

$i = i + 1$ end while

Figure 16:
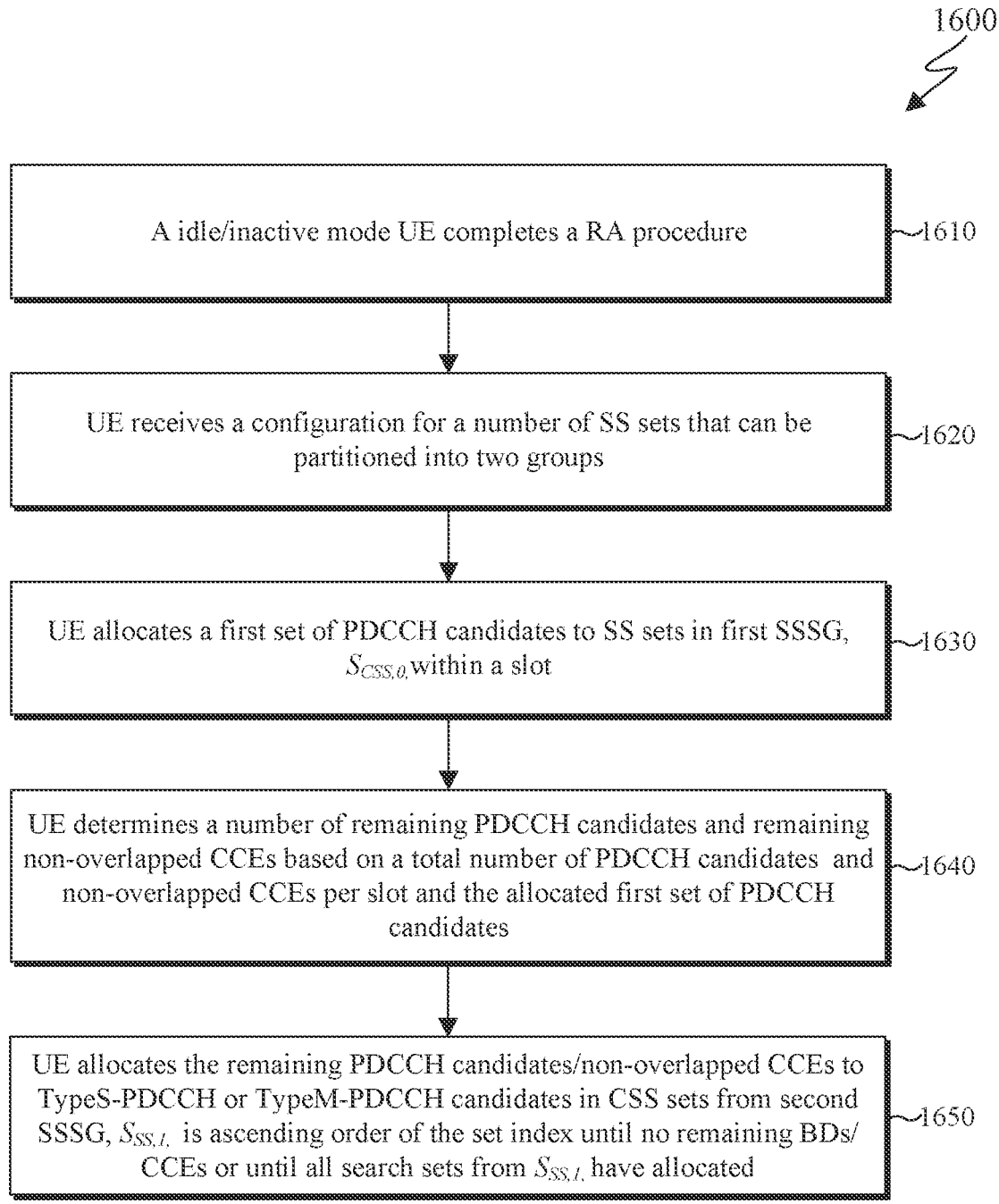

Then method 1600 as illustrated in FIG. 16 describes a fourth example of a procedure for a UE in RRC_IDLE/INACTIVE state to resolve PDCCH overbooking according to the disclosure.

In step 1610, a UE (such as the UE 116) in an RRC_IDLE/INACTIVE state completes a RA procedure on a serving cell. In step 1620, the UE receives a configuration for a number of search space sets for PDCCH monitoring, wherein the number of search space sets can be partitioned into two SSSGs. A first SSSG, $S_{CSS,0}$, includes CSS sets configured with a first set of PDCCH candidates, and a second SSSG, $S_{SS,1}$, includes CSS sets configured with TypeS-PDCCH or TypeM-PDCCH candidates.

In step 1630, the UE allocates a first set of configured PDCCH candidates to CSS sets in the first SSSG, $S_{CSS,0}$, within a slot. In step 1640, the UE determines a number of $M_{PDCCH}^{slot,\mu}$ remaining PDCCH candidates and a number of $C_{PDCCH}^{slot,\mu}$ non-overlapped CCEs within the slot based on a capability corresponding total number of PDCCH candidates and non-overlapped CCEs per slot and the allocated first set of PDCCH candidates to CSS sets in the first SSSG, $S_{CSS,0}$. In step 1650, the UE continues to allocate the remaining PDCCH candidates/non-overlapped CCEs to TypeS-PDCCH or TypeM-PDCCH candidates in search sets from the second SSSG, $S_{SS,1}$, in ascending order of search space set index until no PDCCH candidates or non-overlapped CCEs remain or until all search space sets from $S_{SS,1}$ have TypeM-PDCCH or TypeS-PDCCH candidates allocated.

Figure 13:
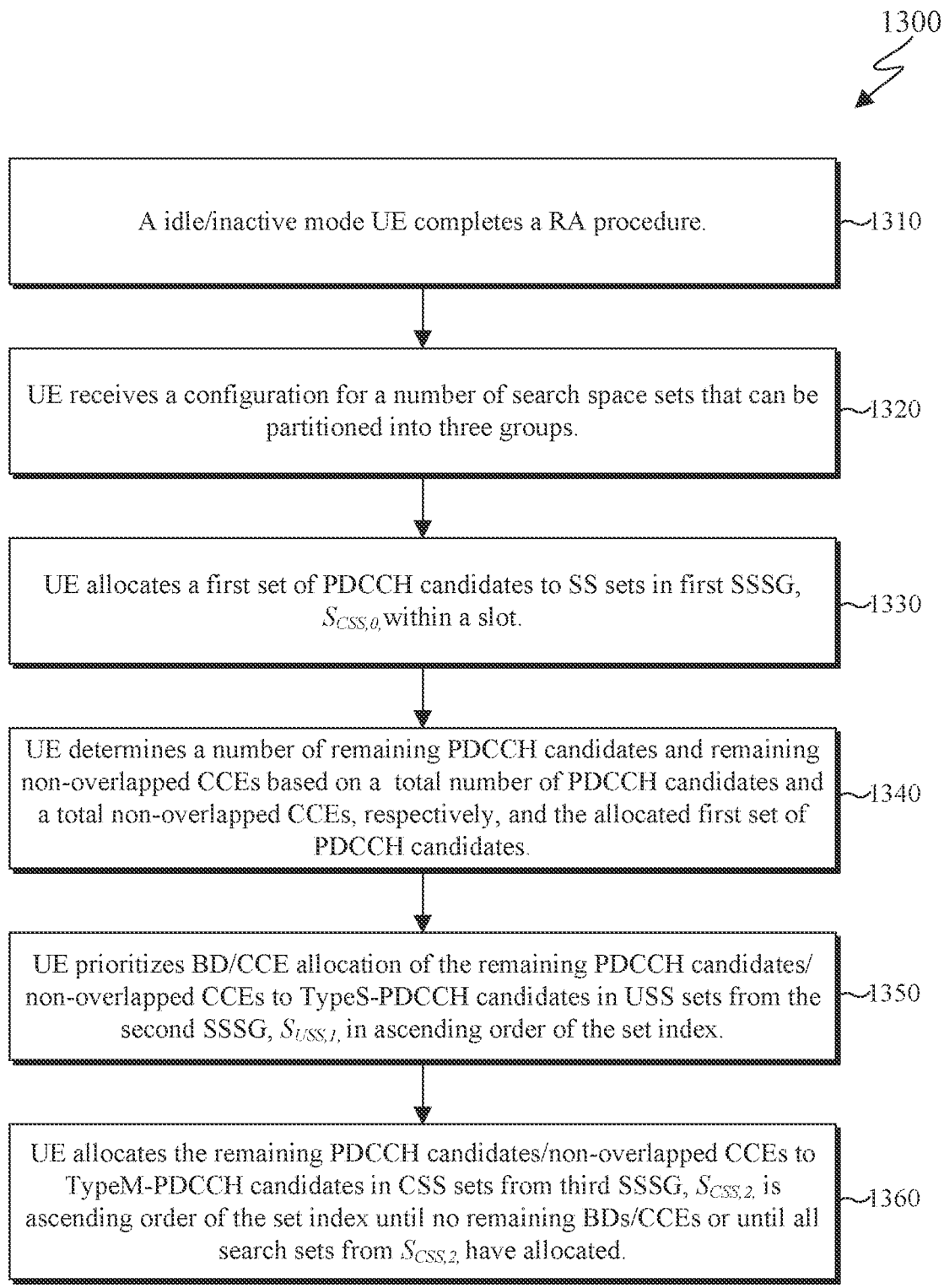

Although FIG. 12 illustrates the method 1200, FIG. 13 illustrates the method 1300, FIG. 14 illustrates the method 1400, FIG. 15 illustrates the method 1500, and the FIG. 16 illustrates the method 1600 various changes may be made to FIGS. 12-16. For example, while the method 1200, the method 1300, the method 1400, the method 1500, and the method 1600 are shown as a series of steps, various steps could overlap, occur in parallel, occur in a different order, or occur multiple times. In another example, steps may be omitted or replaced by other steps. For example, steps of the method 1200, the method 1300, the method 1400, the method 1500, and the method 1600 can be executed in a different order.

Embodiments of the present disclosure describes a DCI format size budget for UEs configured for SDT and for MBS. This is described in the following examples and embodiments, such as those of FIG. 17. That is, embodiments of the disclosure considers a procedure to maintain a predetermined number of sizes for DCI formats for a UE in an RRC_IDLE/INACTIVE state that is configured for SDT or MBS. When the UE is not configured for one of SDT or MBS, for the purposes of the following descriptions, a corresponding number of search space sets or of DCI formats can be assumed to be 0. Although the embodiment is described with respect to an RRC_IDLE/INACTIVE UE, it is also applicable for an RRC_CONNECTED UE at least for MBS.

Figure 17:
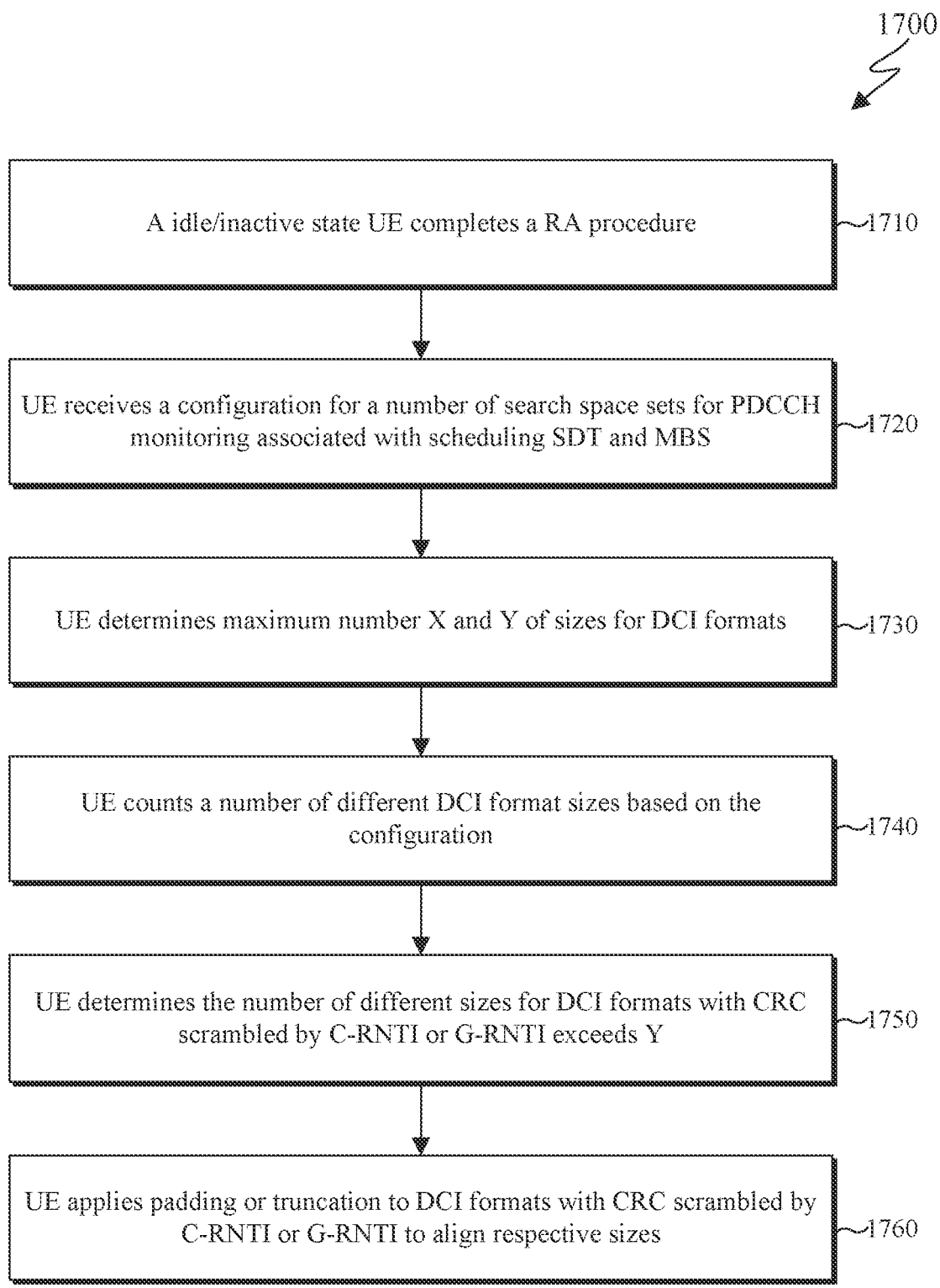
FIG. 17 illustrates an example method for determining a number of DCI format sizes and aligning sizes of DCI formats associated with search space sets that the UE is configured in RRC_IDLE/INACTIVE state according to embodiments of the present disclosure.

FIG. 17 illustrates an example method 1700 for determining a number of DCI format sizes and aligning sizes of DCI formats associated with search space sets that the UE is configured in RRC_IDLE/INACTIVE state according to embodiments of the present disclosure. The steps of the method 1700 of FIG. 17 can be performed by any of the UEs 111-116 of FIG. 1, such as the UE 116 of FIG. 3. The method 1700 is for illustration only and other embodiments can be used without departing from the scope of the present disclosure.

For a UE in RRC_IDLE/INACTIVE state after successful completion of a RA procedure, the UE remains in inactive state without establishing RRC connection, and the UE can be configured to monitor PDCCHs for detection of a DCI format scheduling SDT, including (i) a PDCCH for a DCI format 1_S with CRC scrambled by C-RNTI to schedule a PDSCH, or (ii) a PDCCH for a DCI format 0_S with CRC scrambled by C-RNTI to schedule a PUSCH.

The UE can also be configured to monitor PDCCHs for detection of one or more DCI format 1_M with CRC scrambled by one or more G-RNTIs to schedule respective one or more PDSCHs for MBS.

For determining a number of DCI format sizes in RRC_IDLE/INACTIVE state, a UE expects to monitor PDCCH candidates for up to X sizes of first DCI formats that include up to Y sizes of second DCI formats that are a subset of the first DCI formats. The UE counts a number of sizes for DCI formats based on a number of configured PDCCH candidates in respective search space sets. X or Y can be defined in specification of the system operation, for example, X=4. Y<X, for example, Y=3. The UE expects to align the size of second DCI formats when the UE has search space sets associated with the second DCI formats having a total number of sizes that exceeds Y.

The second DCI formats can be one of the following three examples. In a first example, the second DCI formats include both DCI formats with CRC scrambled by a C-RNTI for scheduling SDT and DCI formats with CRC scrambled by a G-RNTI for scheduling MBS regardless of whether the DCI formats are associated with a CSS set or a USS set. Therefore, unlike other DCI formats with CRC bits that are not scrambled by C-RNTI and are associated with CSS sets, sizes of DCI formats scheduling MBS PDSCH that are associated with CSS sets and have CRC bits scrambled by G-RNTI are counted toward a same limit Y as sizes of DCI formats with CRC scrambled by C-RNTI.

In a second example, a size of a DCI format with CRC scrambled by G-RNTI for scheduling MBS is restricted by X, as for other DCI formats that have associated PDCCH monitoring according to CSS sets and have CRC that is not scrambled by C-RNTI, and the DCI format is not one of the second DCI formats.

In a third example, the second DCI formats include a DCI format with CRC scrambled by G-RNTI for scheduling MBS regardless of whether the DCI format is associated with a CSS set or a USS set. The UE can count sizes of DCI formats with CRC scrambled by C-RNTI for scheduling SDT as for first DCI formats for a total number of sizes that is restricted by X regardless the DCI formats are associated with USS sets or CSS sets.

In certain embodiments, a UE (such as the UE 116) can count sizes of DCI formats depending on the RRC state. For example, a UE counts sizes of DCI formats separately when the UE is in an RRC_INACTIVE state or in an RRC_IDLE state than when the UE is an RRC_CONNECTED state. A total number of sizes of DCI formats the UE monitor PDCCH for detection on both RRC_INACTIVE and RRC_CONNECTED states (or both the RRC_IDLE and RRC_CONNECTED states) can be larger than the respective limits of X and Y while a total number of sizes of DCI formats the UE monitors PDCCH for detection on either the RRC_INACTIVE state (or RRC_IDLE state) or the RRC_CONNECTED state is within the respective limits of X and Y. A UE hardware knows the RRC state of the UE and therefore there is no additional UE complexity when the total number of sizes of DCI formats the UE monitors PDCCH for detection on both RRC_INACTIVE and RRC_CONNECTED states is larger than the respective limits of X and Y while a serving gNB has more flexibility to dimension the sizes of the DCI formats for each corresponding RRC state according to respective scheduling requirements.

If a number of sizes of DCI formats associated with configured search space sets exceeds a predetermined number of sizes, such as X or Y, padding or truncation applies to DCI formats with CRC bits scrambled by C-RNTI or to DCI formats with CRC bits scrambled by G-RNTI according to any of the following methods.

In a first method for padding or truncation of DCI formats, a size of a DCI format 0_S and a size of a DCI format 1_S that are associated with CSS sets are aligned based on the following four steps. In a first step, the size of the DCI format 0_S is determined. Here, a size of a frequency domain resource assignment (FDRA) field in the DCI format 0_S is based on a size of an active uplink (UL) BWP, such as an initial UL BWP, in number of RBs. In a second step a size of DCI format 1_S is determined. Here a size of a FDRA field in the DCI format 1_S is based on a size of CORESET #0 or a size of an active DL BWP, such as an initial DL BWP, in number of RBs. In a third step, if a number of information bits in the DCI format 0_S prior to padding is less than the payload size of the DCI format 1_S, a number of zero padding bits are generated for the DCI format 0_S until the payload size equals that of the DCI format 1_S. In a fourth step. If a number of information bits in the DCI format 0_S prior to truncation is larger than the payload size of the DCI format 1_S, the bit width of the FDRA field in the DCI format 0_S is reduced by truncating the first few most significant bits such that the size of DCI format 0_S equals the size of the DCI format 1_S.

In a second method for padding or truncation of DCI formats, a size of a DCI format 0_S and of a DCI format 1_S that are associated with USS sets are aligned based on the following four steps. In a first step, a size of DCI format 0_S is determined. Here, a size of a FDRA field in the DCI format 0_S is based on a size of an active UL BWP or on a size of an initial UL BWP in number of RBs. In a second step, a size of DCI format 1_S is determined. Here a size of a FDRA field in the DCI format 1_S is based on a size of an active DL BWP or a size of CORESET #0 or a size of initial DL BWP in number of RBs. In a third step, if a number of information bits in the DCI format 0_S prior to padding is less than the payload size of the DCI format 1_S, a number of zero padding bits are generated for the DCI format 0_S until the payload size equals that of the DCI format 1_S. In a fourth step, if a number of information bits in the DCI format 1_S prior to padding is less than the payload size of the DCI format 0_S, a number of zero padding bits are generated for the DCI format 1_S until the payload size equals that of the DCI format 0_S.

In a third method for padding or truncation DCI formats, the UE aligns a size of DCI format 1_S and a size of DCI format 1_M associated with CSS sets based on the following four steps. In a first step, a size of DCI format 1_S is determined. Here, the FDRA field is based on a size of CORESET #0, or a size of and initial DL BWP, in number of RB s. In a second step, a size of DCI format 1_M is determined. Here the FDRA field is based on an RB size of CORESET #0 or an RB size of initial DL BWP. In a third step, if a number of information bits in the DCI format 1_S prior to padding is less than the payload size of the DCI format 1_M, a number of zero padding bits are generated for the DCI format 1_S until the payload size equals that of the DCI format 1_M. In a fourth step, if a number of information bits in the DCI format 1_M prior to padding is less than the payload size of the DCI format 1_S, a number of zero padding bits are generated for the DCI format 1_M until the payload size equals that of the DCI format 1_S.

A combination of more than one methods can also apply in a predetermined order. For example, the combination can be in the order of $\{1^{st}$ method, $2^{nd}$ method, $3^{rd}$ method$\}$. For another example, the combination can be in the order of $\{1^{st}$ method, $2^{nd}$ method$\}$.

The method 1700 as illustrated in FIG. 17 describes an example of UE procedure for determining a number of DCI format sizes and aligning sizes of DCI formats associated with search space sets that the UE is configured in RRC_IDLE/INACTIVE state according to the disclosure.

In step 1710, a UE (such as the UE 116) in RRC_IDLE/INACTIVE state completes a RA procedure on a serving cell. The UE remains in the idle/inactive mode without establishing an RRC connection. In step 1720. the UE receives a configuration for a number of search space sets for PDCCH monitoring associated with scheduling SDT and MBS.

In step 1730, the UE determines first maximum number Y and a second maximum number X of sizes for DCI formats depending on an RNTI. It is noted that for counting toward the value of Y, DCI formats associated with CSS sets and having CRC bits scrambled by an RNTI other than a C-RNTI are not counted together with sizes of DCI formats having CRC bits scrambled by a C-RNTI except for sizes of DCI formats with CRC bits scrambled by a G-RNTI, while all sizes of DCI formats are counted together toward the value of Y. The values of Y and X can be provided in the specifications of the system operation or be informed to a serving gNB by the UE as a capability.

In step 1740, the UE counts a number of different DCI format sizes based on the configuration for the number of search space sets. In step 1750, the UE determines that the number of different sizes for DCI formats with CRC bits scrambled by a C-RNTI or by a G-RNTI, exceeds Y. In step 1760, the UE applies padding or truncation to DCI formats with CRC bits scrambled by C-RNTI or G-RNTI to align respective sizes so that a total number of sizes is not larger than Y. The value of Y can be different for a UE in an RRC_INACTIVE/IDLE state that for a UE in an RRC_CONNECTED state.

Although FIG. 17 illustrates the method 1700 various changes may be made to FIG. 17. For example, while the method 1700 is shown as a series of steps, various steps could overlap, occur in parallel, occur in a different order, or occur multiple times. In another example, steps may be omitted or replaced by other steps. For example, steps of the method 1700 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive information to skip reception of a number of physical downlink control channels (PDCCHs) over a number of slots;
a processor operably coupled to the transceiver, the processor configured to:
instruct the transceiver to receive first PDCCHs in first slots from the number of slots when the UE transmits a physical uplink control channel (PUCCH) that provides a positive scheduling request (SR) in a first slot that is before the first slots, and
instruct the transceiver to skip the reception of the number of PDCCHs in the number of slots when the UE does not transmit the PUCCH in the first slot,
wherein the transceiver is further configured to, based on the instruction by the processor, receive the first PDCCHs in the first slots or skip the reception of the number of PDCCHs in the number of slots.

2. The UE of claim 1, wherein the reception of the number of PDCCHs is according to UE-specific search space sets or according to common search space sets that do not schedule receptions of physical downlink shared channels (PDSCHs) that provide system information, random access responses, or paging.

3. The UE of claim 1, wherein the reception of the first PDCCHs includes all PDCCH receptions from the number of PDCCHs in the first slots.

4. The UE of claim 1, wherein the first slots include all slots from the number of slots after the first slot.

5. The UE of claim 1, wherein the information to skip the reception of the number of PDCCHs over the number of slots is provided by a downlink control information (DCI) format.

6. The UE of claim 1, wherein the processor is further configured to:
instruct the transceiver to receive second PDCCHs in second slots from the number of slots when the UE transmits a physical random access channel (PRACH) in a second slot that is before the second slots, and
instruct the transceiver to skip the reception of the number of PDCCHs in the number of slots when the UE does not transmit the PRACH in the second slot.

7. The UE of claim 6, wherein the second slots start at a predetermined slot after the second slot.

8. A base station (BS) comprising:
a transceiver configured to transmit information to skip transmission of a number of physical downlink control channels (PDCCHs) over a number of slots;
a processor operably coupled to the transceiver, the processor is configured to:
instruct the transceiver to transmit first PDCCHs in first slots from the number of slots when the BS receives a physical uplink control channel (PUCCH) that provides a positive scheduling request (SR) in a first slot that is before the first slots, and
instruct the transceiver to skip the transmission of the number of PDCCHs in the number of slots when the BS does not receive the PUCCH in the first slot,
wherein the transceiver is further configured to, based on the instruction by the processor, transmit the first PDCCHs in the first slots or skip the transmission of the number of PDCCHs in the number of slots.

9. The BS of claim 8, wherein the transmission of the number of PDCCHs is according to UE-specific search space sets or according to common search space sets that do not schedule transmissions of physical downlink shared channels (PDSCHs) that provide system information, random access responses, or paging.

10. The BS of claim 8, wherein the transmission of the number of PDCCHs includes all PDCCH transmissions from the number of PDCCHs in the first slots.

11. The BS of claim 8, wherein the first slots include all slots from the number of slots after the first slot.

12. The BS of claim 8, wherein the information to skip the transmission of the number of PDCCHs over the number of slots is provided by a downlink control information (DCI) format.

13. The BS of claim 8, wherein the processor is further configured to:
instruct the transceiver to transmit second PDCCHs in second slots from the number of slots when the BS receives a physical random access channel (PRACH) in a second slot that is before the second slots, and
instruct the transceiver to skip the transmission of the number of PDCCHs in the number of slots when the BS does not receive the PRACH in the second slot.

14. The BS of claim 13, wherein the second slots start at a predetermined slot after the second slot.

15. A method comprising:
receiving information to skip reception of a number of physical downlink control channels (PDCCHs) over a number of slots;

determining an instruction to:
   receive first PDCCHs in first slots from the number of slots based on a transmission of a physical uplink control channel (PUCCH) that provides a positive scheduling request (SR) in a first slot that is before the first slots, or
   skip the reception of the number of PDCCHs in the number of slots based on an absence of transmission of the PUCCH in the first slot; and
based on the instruction, receiving the first PDCCHs in the first slots or skipping the reception of the first PDCCHs in the number of slots.

16. The method of claim 15, wherein the reception of the number of PDCCHs is according to UE-specific search space sets or according to common search space sets that do not schedule receptions of physical downlink shared channels (PDSCHs) that provide system information, random access responses, or paging.

17. The method of claim 15, wherein the reception of the first PDCCHs includes all PDCCH receptions from the number of PDCCHs in the first slots.

18. The method of claim 15, wherein the first slots include all slots from the number of slots after the first slot.

19. The method of claim 15, further comprising:
determining an instruction to:
   receive second PDCCHs in second slots from the number of slots based on a transmission of a physical random access channel (PRACH) in a second slot that is before the second slots, or
   skip the reception of the number of PDCCHs in the number of slots based on an absence of the transmission of the PRACH in the second slot.

20. The method of claim 19, wherein the second slots start at a predetermined slot after the second slot.

* * * * *